(12) United States Patent
Amuru et al.

(10) Patent No.: US 11,483,867 B2
(45) Date of Patent: Oct. 25, 2022

(54) APPARATUS AND METHOD FOR HANDLING BANDWIDTH PART CONFIGURATION FOR RANDOM ACCESS CHANNEL PROCEDURE IN WIRELESS COMMUNICATION SYSTEM

(71) Applicant: Samsung Electronics Co., Ltd, Suwon-si (KR)

(72) Inventors: Saidhiraj Amuru, Bangalore (IN); Anil Agiwal, Bangalore (IN); Anshuman Nigam, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/148,841

(22) Filed: Oct. 1, 2018

(65) Prior Publication Data
US 2019/0104554 A1    Apr. 4, 2019

(30) Foreign Application Priority Data

Sep. 29, 2017  (IN) .............................. 201741034778
Jun. 11, 2018  (IN) .............................. 201741034778

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0007* (2013.01); *H04L 5/0053* (2013.01);
(Continued)

(58) Field of Classification Search
None
See application file for complete search history.

(56) References Cited

U.S. PATENT DOCUMENTS

2018/0098361 A1*  4/2018  Ji ...................... H04W 74/0866
2018/0249479 A1*  8/2018  Cho .................... H04W 12/106
(Continued)

FOREIGN PATENT DOCUMENTS

| EP | 3445123 A1 | 2/2019 |
| WO | 2014/139174 A1 | 9/2014 |
| WO | 2017/024560 A1 | 2/2017 |

OTHER PUBLICATIONS

"3rd Generation Partnership Project; Technical Specification Group Radio Access Network; NR; Physical layer procedures for control (Release 15)", 3GPP TS 38.213 v1.0.0 (Sep. 2017), 16 pages.
(Continued)

*Primary Examiner* — Adnan Baig

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). Embodiments herein disclose a method of handling BWP configurations for a RACH procedure in a wireless network. The method includes configuring, by a BS, a BWP configuration comprising RACH resource for each BWP in a set of BWPs for the RACH procedure. Further, the method includes indicating, by the BS, the RACH resource for each of the BWPs in the set of BWPs to a UE in the wireless network.

16 Claims, 24 Drawing Sheets

(51) Int. Cl.
*H04W 72/04* (2009.01)
*H04B 7/06* (2006.01)
*H04W 74/00* (2009.01)
*H04L 27/26* (2006.01)

(52) U.S. Cl.
CPC ......... *H04W 72/042* (2013.01); *H04B 7/0617* (2013.01); *H04L 5/001* (2013.01); *H04L 5/0048* (2013.01); *H04L 27/2602* (2013.01); *H04W 74/006* (2013.01)

(56) References Cited

U.S. PATENT DOCUMENTS

| | | | |
|---|---|---|---|
| 2019/0230696 A1* | 7/2019 | Kim | H04L 5/00 |
| 2020/0252180 A1* | 8/2020 | Takeda | H04W 72/042 |
| 2021/0168749 A1* | 6/2021 | Turtinen | H04W 80/02 |

OTHER PUBLICATIONS

LG Electronics et al., "WF on Bandwidth Part for DL common channel", 3GPP TSG RAN WG1 Meeting RAN1 #90, Aug. 21-25, 2017, 5 pages, R1-1715075.
MediaTek Inc., "Further Details on Bandwidth Part Operation in NR", 3GPP TSG RAN WG1 Meeting #90, Aug. 21-25, 2017, 10 pages, R1-17013978.
Guangdong OPPO Mobile Telecom, "Bandwidth part based resource scheduling for carrier aggregation", 3GPP TSG RAN WG1 Meeting #90, Aug. 21-25, 2017, 4 pages, R1-1713265.
Written Opinion of the International Searching Authority dated Dec. 20, 2018 in connection with International Patent Application No. PCT/KR2018/011502, 6 pages.
International Search Report dated Dec. 20, 2018 in connection with International Patent Application No. PCT/KR2018/011502, 3 pages.
LG Electronics et al., "WF on Bandwidth Part for DL common channel", 3GPP TSG RAN WG1 Meeting RAN1 #90, Aug. 21-25, 2017, R1-1715075, 5 pages.
OPPO, "Impact of BWP on CA", 3GPP TSG RAN WG2 #99-Bis, Oct. 9-13, 2017, R2-1710125, 3 pages.
Ericsson, "NB-IoT-Remaining issues for random access procedure", 3GPP TSG-RAN WG1 NB-IoT Ad-Hoc Meeting, Mar. 22-24, 2016, R1-161836, 7 pages.
LG Electronics, "RACH procedure", 3GPP TSG RAN WG1 Meeting NR#3, Sep. 18-21, 2017, R1-1715846, 7 pages.
ETRI, "Remaining details of bandwidth part for initial access", 3GPP TSG RAN WG1 Meeting NR Ad-Hoc #3, Sep. 18-21, 2017, R1-1715770, 5 pages.
Fujitsu, "Discussion on RACH procedure", 3GPP TSG RAN WG1 Meeting #88bis, Apr. 3-7, 2017, R1-1704477, 6 pages.
Supplementary European Search Report dated Aug. 7, 2020 in connection with European Patent Application No. 18 86 1325, 12 pages.
Office Action dated Jun. 17, 2020 in connection with India Patent Application No. 201741034778, 6 pages.
Communication pursuant to Article 94(3) EPC dated Apr. 30, 2021 in connection with European Application No. 18861325.1, 10 pages.
Huawei, et al., "WF on techniques of interference mitigation," R1-1714927, 3GPP TSG RAN WG1 Meeting #90, Agenda item 5.2.8.1, Prague, Czech Republic, Mar. 21-25, 2017, 2 pages.
European Patent Office, "Communication pursuant to Article 94(3) EPC" dated Nov. 15, 2021, in connection with European Patent Application No. EP18861325.1, 6 pages.
IP Australia, "Examination report No. 1 for standard patent application," dated Jun. 16, 2022, in connection with Australian Patent Application No. 2018341637, 3 pages.
Intellectual Property India, "Examination report under sections 12 & 13 of the Patents Act," dated Mar. 31, 2022, in connection with Indian Patent Application No. 202027018284, 6 pages.
European Patent Office, "Communication pursuant to Article 94(3) EPC" dated May 23, 2022, in connection with European Patent Application No. 18 861 325.1, 7 pages.
CATT, "Way Forward for the Numerology in NR RA Procedures" 3GPP TSG RAN WG1#90, Prague, Czech Republic, Aug. 21-25, 2017, R1-1714963, 6 pages.
CATT, "Further details on NR4-step RA Procedure" 3GPP TSG RAN WG1 Meeting NR#3, R1-1715790, Nagoya, Japan, Sep. 18-21, 2017, 13 pages.

\* cited by examiner

| Slot type | Possible symbol mappings | | | |
|---|---|---|---|---|
| | No PDCCH | 1 symbol PDCCH | 2 symbol PDCCH | 3 symbol PDCCH |
| 7 symbol monitoring periodicity | No issue | {2,3,4,5}, {3,4,5,6} {9,10,11,12}, {10,11,12,13} | {3,4,5,6} {10,11,12,13} | No place to accommodate |
| 14 symbol monitoring periodicity | No issue | No issue | No issue | No issue |

FIG. 14

| DL | DL | GAP | UL | UL | UL | UL | DL | DL | GAP | UL | UL | UL | UL |

FIG.16

| Slot format | DL/UL | DL/UL | DL/RACH | DL/UL | DL/UL | DL/RACH | ····· |
|---|---|---|---|---|---|---|---|
| Slot number | Slot 1 | Slot 2 | Slot 3 | Slot 4 | Slot 5 | Slot 6 | ····· |

FIG.17

APPARATUS AND METHOD FOR HANDLING BANDWIDTH PART CONFIGURATION FOR RANDOM ACCESS CHANNEL PROCEDURE IN WIRELESS COMMUNICATION SYSTEM

CROSS-REFERENCE TO RELATED APPLICATIONS

The present application is based on and claims priority under 35 U.S.C. § 119 to Indian Patent Application No. 201741034778 filed on Sep. 29, 2017 and Indian Patent Application No. 201741034778 filed on Jun. 11, 2018, the disclosures of which are incorporated herein by reference in their entireties.

BACKGROUND

1. Field

Embodiments disclosed herein relate to a wireless communication network, and more specifically related to a method and system for handling bandwidth part (BWP) configurations for a random access channel (RACH) procedure in a wireless network.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

The principal object of the embodiments herein is to disclose a method and system for handling bandwidth part (BWP) configurations for a random access channel (RACH) procedure in a wireless communication system.

Another object of the embodiments herein is to configure, by a base station (BS), a BWP configuration including RACH resource(s) for each BWP in a set of BWPs for the RACH procedure.

Another object of the embodiments herein is to indicate, by the BS, the RACH resource for each of the BWPs in the set of BWPs to a user equipment (UE) in the wireless network.

Another object of the embodiments herein is to configure, by the BS, the RACH resource(s) for the activated BWP for the RACH procedure.

Another object of the embodiments herein is to indicate, by the BS, the RACH resource for the activated BWP in the UE.

Another object of the embodiments herein is to indicate, by the BS, a timing advance (TA) value to the UE upon completion of the RACH procedure in terms of the granularity of a specific numerology.

Another object of the embodiments herein is to receive, by the UE, the BWP configuration including RACH resource(s) for each BWP in the set of BWPs for the RACH procedure from the BS.

Another object of the embodiments herein is to perform, by the UE, the RACH procedure on the selected BWP from the set of BWPs using the RACH resource(s) for the selected BWP indicated in the BWP configuration.

Another object of the embodiments herein is to receive, by the UE, the Random access response message on the selected BWP from the BS.

Another object of the embodiments herein is to receive, by the UE, the BWP configuration including the RACH resource(s) for the active BWP from the BS.

Another object of the embodiments herein is to perform, by the UE, the RACH procedure on the active BWP using the RACH resource(s) for the active BWP.

Another object of the embodiments herein is to perform the RACH procedure on the active bandwidth part when the RACH resource(s) are available.

Another object of the embodiments herein is to switch, by the UE, to a default bandwidth part or initial active bandwidth part from the set of BWPs, when the RACH resource(s) are not available in the active bandwidth part.

Accordingly, the embodiments herein disclose a method of handling BWP configurations for a RACH procedure in a wireless network. The method includes configuring, by a BS, a BWP configuration comprising RACH resource for each BWP in a set of BWPs for the RACH procedure. Further, the method includes indicating, by the BS, the RACH resource for each of the BWPs in the set of BWPs to a UE in the wireless network.

In an embodiment, the RACH resource for each of the BWPs is indicated to the UE using at least one of a remaining minimum system information (RMSI), a BWP configuration procedure via a radio resource control (RRC) indication, and a BWP activation mechanism via a downlink control information (DCI).

In an embodiment, each of the BWPs in the set of BWPs is associated with one of same numerology and different numerology.

In an embodiment, the method includes indicating, by the BS, a TA value to the UE upon completion of the RACH procedure in terms of the granularity of the numerology (e.g., sub carrier spacing (SCS)) used by one of: a Random access Preamble numerology of a preamble format used by the UE and configured in a BWP configuration, a Scheduled Transmission numerology configured for the UE in a RMSI, an ongoing uplink (UL) data transmission numerology in a primary cell in case of a contention free RACH in the primary cell, an ongoing UL data transmission numerology in a secondary cell, a numerology configured for the supplementary uplink (SUL) carrier, and a numerology commonly chosen among multiple bandwidth parts in the case of multiple simultaneously active bandwidth parts.

In an embodiment, a granularity of the TA value depends on the numerology of a first UL transmission after receiving a random access response (RAR).

Accordingly, the embodiments herein disclose a method of handling BWP configurations for a RACH procedure in a wireless network. The method includes activating, by a BS, a selected BWP from a set of BWPs when a UE attempts to establish a RRC connection with the BS for the RACH procedure. Further, the method includes configuring, by the BS, RACH resource for the activated BWP for the RACH procedure. Furthermore, the method includes indicating, by the BS, the RACH resource for the activated BWP in the UE.

Accordingly, the embodiments herein disclose a method of handling BWP configurations for a RACH procedure in a wireless network. The method includes receiving, by a UE, a BWP configuration comprising RACH resources for each BWP in a set of BWPs for a RACH procedure from a BS in the wireless network. Further, the method includes performing, by the UE, the RACH procedure on a selected BWP from the set of BWPs using the RACH resource for the selected BWP indicated in the BWP configuration. Further, the method includes receiving, by the UE, a Random access response message on the selected BWP from the BS.

In an embodiment, the RACH resource for each of the BWPs is received by the UE using at least one of the RMSI, the BWP configuration procedure via the RRC indication, and a BWP activation mechanism via the DCI.

In an embodiment, the method includes receiving by the UE a Random access response message on the selected BWP.

In an embodiment, when the UE does not perform the RACH on all BWPs, a TA value used on different the BWPs is one of same as a TA value of an initial active BWP, zero for all the BWPs other than an initial active BWP, a pre-configured max TA value that accounts for a cell size and a frequency variations across the various BWPs, same TA value for all the BWPs supported within a same transceiver unit (TXRU) and a different TA value for the BWPs belonging to other TXRUs as indicated by the BS, the TA value indicated in the BWP configuration, and same TA value for all the BWPs associated with one SS block.

In an embodiment, the TA value is derived based on a quasi co-location relationship (QCL) between multiple TXRUs.

In an embodiment, the UE receives the Random access response message on the selected BWP from the BS in at least one of a current active BWP on a primary cell, initial active BWP on a primary cell, a default BWP configured to the UE on a primary cell, and one of multiple active BWPs when the UE supports multiple active BWP, wherein an index of the supported multiple active BWP is provided to the UE by the BS, and the index of BWP is related to the RACH resource and/or preamble chosen by the UE.

Accordingly, the embodiments herein disclose a method of handling BWP configurations for a RACH procedure in a wireless network. The method includes establishing, by a UE, an RRC connection on an active BWP. The method includes receiving, by the UE, a BWP configuration including RACH resource for the active BWP from a BS in the wireless network. Further, the method includes performing, by the UE, a RACH procedure on the active BWP using the RACH resource for the active BWP. Furthermore, the method includes receiving, by the UE, a Random access response message on the active BWP from the BS.

In an embodiment, the selected BWP is activated when UE attempts to establish a RRC connection.

In an embodiment, the UE performs the RACH procedure on the active bandwidth part when the RACH resource is available.

In an embodiment, the UE switches to a default bandwidth part or initial active bandwidth part from a set of BWPs, when the RACH resource is not available in the active bandwidth part.

Accordingly, the embodiments herein disclose a BS for handling BWP configurations for a RACH procedure in a wireless network. The BS includes a BWP controller coupled to a memory and a processor. The BWP controller configures a BWP configuration including RACH resource for each BWP in a set of BWPs for the RACH procedure. The BWP controller indicates the RACH resource for each of the BWPs in the set of BWPs to a UE in the wireless network.

Accordingly, the embodiments herein disclose a BS for handling BWP configurations for a RACH procedure in a wireless network. The BS includes a BWP controller coupled to a memory and a processor. The BWP controller activates a selected BWP from a set of BWPs when a UE attempts to establish an RRC connection with the BS for the RACH procedure. The BWP controller configures RACH resource for the activated BWP for the RACH procedure. The BWP controller indicates the RACH resource for the activated BWP in the UE.

Accordingly, the embodiments herein disclose a UE for handling BWP configurations for a RACH procedure in a wireless network. The UE includes a BWP controller coupled to a memory and a processor. The BWP controller receives a BWP configuration comprising RACH resource for each BWP in a set of BWPs for a RACH procedure from a BS in the wireless network. The BWP controller performs the RACH procedure on a selected BWP from the set of BWPs using the RACH resource for the selected BWP indicated in the BWP configuration. The BWP controller receives a Random access response message on the selected BWP from the BS.

Accordingly, the embodiments herein disclose a UE for handling BWP configurations for a RACH procedure in a wireless network. The UE includes a BWP controller coupled to a memory and a processor. The BWP controller establishes the RRC connection on an active BWP. The BWP controller receives a BWP configuration including RACH resource for the active BWP from a BS in the wireless network. The BWP controller performs a RACH procedure on the active BWP using the RACH resource for the active BWP. The BWP controller receives a random access response message on the active BWP from the BS.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 14 shows the candidate PRACH symbol mapping in a slot depending on the CORESET monitoring periodicity, according to embodiments as disclosed herein;

FIG. 16 depicts an example slot format indicated to the UE, according to embodiments as disclosed herein;

FIG. 17 depicts an example Slot format with potential RACH locations (RACH slots) given to the user, according to embodiments as disclosed herein;

DETAILED DESCRIPTION

Figure 1:
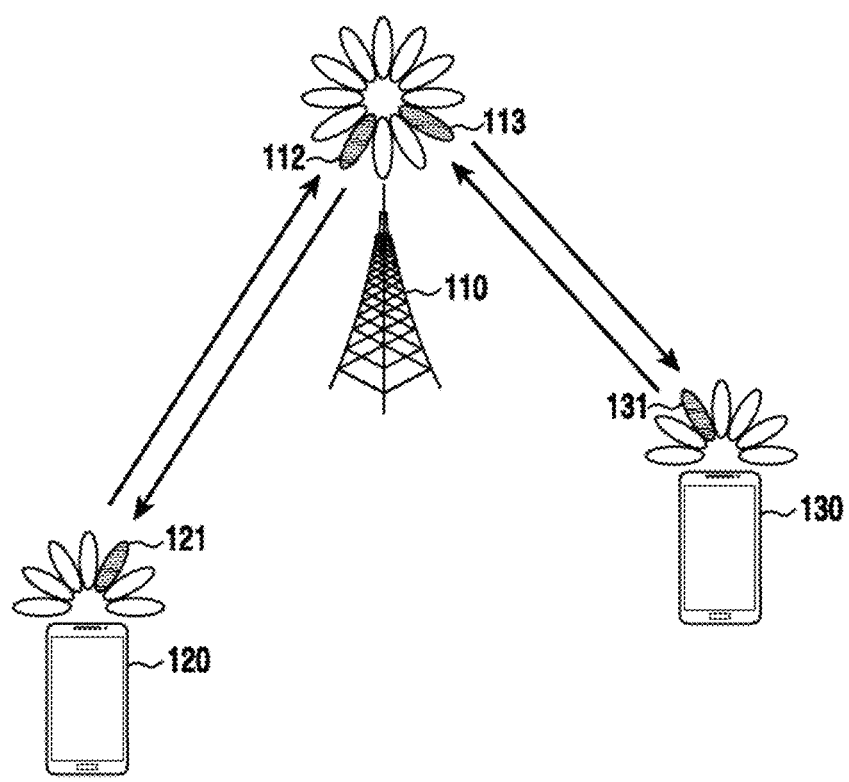
FIG. 1 illustrates a wireless communication system according to various embodiments of the present disclosure.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the present disclosure. Likewise, the blocks of the embodiments may be physically combined into more complex blocks without departing from the scope of the present disclosure The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The embodiments herein achieve a method of handling bandwidth part (BWP) configurations for a random access channel (RACH) procedure in a wireless network. The method includes configuring, by a base station (BS), a BWP configuration comprising RACH resource for each BWP in a set of BWPs for the RACH procedure. Further, the method includes indicating, by the BS, the RACH resource for each of the BWPs in the set of BWPs to a UE in the wireless network.

In recent years, several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service, but also data service. In recent years, the fourth wireless communication system has been developed to provide high-speed data service. However, currently, the fourth generation wireless communication system suffers from lack of resources to meet the growing demand for high speed data services. So, the fifth generation (5G) wireless systems are being developed to meet the growing demand for high speed data services, support ultra-reliability and low latency applications.

The 5G wireless systems is implemented not only in lower frequency bands, but also in higher frequency (mm-Wave) bands, e.g., 10 GHz to 100 GHz bands, so as to accomplish higher data rates. In order to mitigate propagation loss of radio waves and increase the transmission distance, the beamforming, massive multiple-input multiple-output (MIMO), full dimensional MIMO (FD-MIMO), array antenna, an analog beam forming, large scale antenna techniques are being considered in the design of the 5G wireless systems. In addition, the 5G wireless systems are expected to address different use cases having quite different requirements in terms of data rate, latency, reliability, mobility and so on. However, it is expected that the design of the air-interface of the 5G wireless systems would be flexible enough to serve user equipments (UEs) having quite different capabilities depending on the use case and market segment the UE cater service to the end customers. The 5G wireless systems are expected to address uses cases such as enhanced mobile broadband (eMBB), massive machine type communication (m-MTC), ultra-reliable low latency communication (URLL) and so on. The eMBB requirements like tens of Gbps data rate, low latency, high mobility so on and so forth address the market segment representing conventional wireless broadband subscribers needing internet connectivity everywhere, all the time and on the go. The m-MTC requirements like very high connection density, infrequent data transmission, very long battery life, low mobility address so on and so forth address the market segment representing Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In Long Term Evolution (LTE) wireless systems, the UE first performs an initial access procedure by scanning for a primary synchronization signal (PSS), and a Secondary synchronization signal (SSS) and then becoming synchronized in a downlink signal. Upon synchronization, the random access procedures are performed in order to acquire an uplink synchronization in order to send uplink transmissions appropriately. Owing to the beamforming technologies used in the above-6 GHz spectrum, the above mentioned procedures will not function adequately in the 5G wireless systems.

Thus, it is desired to address the above mentioned disadvantages or other shortcomings or at least provide a useful alternative.

Unlike conventional methods and systems, the proposed method can be used to handle the BWP configurations for the RACH procedure in the wireless network in an effective manner. The proposed method can be used to handle the BWP configurations for the RACH procedure in the wireless network in an effective manner during the handover procedure. Further, the method can be used to handle the BWP configurations for the RACH procedure in the wireless network for carrier aggregation and dual connectivity scenarios in an effective manner.

Various embodiments of the present disclosure are adopted in 3GPP 38.213 standard.

Referring now to the drawing, and more particularly to FIGS. 6a to 18, there are shown preferred embodiments.

FIG. 1 illustrates a wireless communication system according to various embodiments of the present disclosure. In FIG. 1, a BS 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5G node," "gNB," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "UE," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

Figure 2:
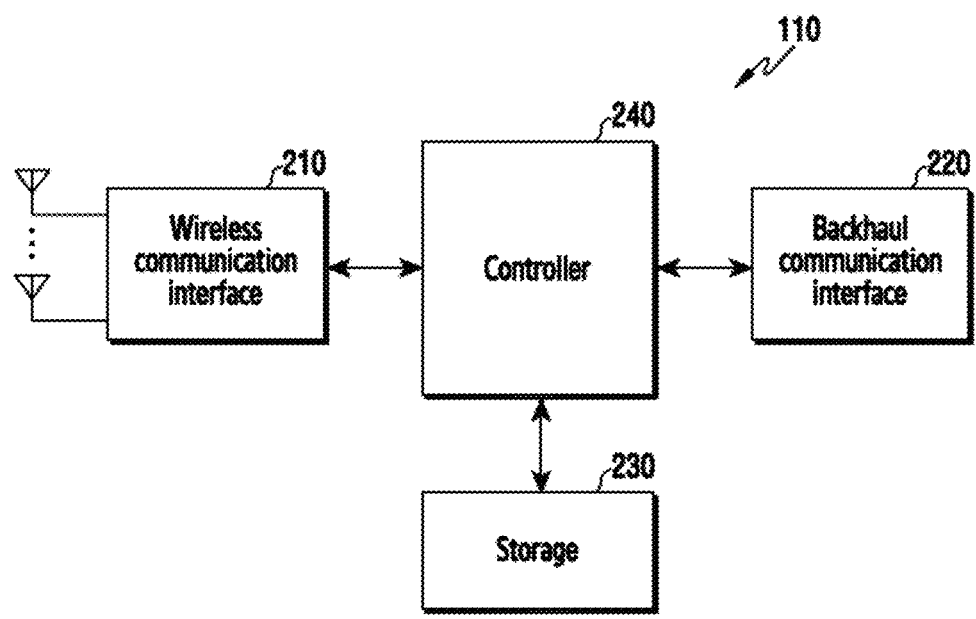
FIG. 2 illustrates the BS in the wireless communication system according to various embodiments of the present disclosure.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into a radio frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "wireless communication unit", a "wireless communication module", a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams. The backhaul communication interface 220 may be referred to as a "backhaul communication unit" or a "backhaul communication module".

The storage unit 230 stores a basic program, an application, and data such as setting information for the operation of the BS. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor. According to various embodiments, the controller 240 may control the base station to perform operations according to the exemplary embodiments of the present disclosure.

Figure 3:
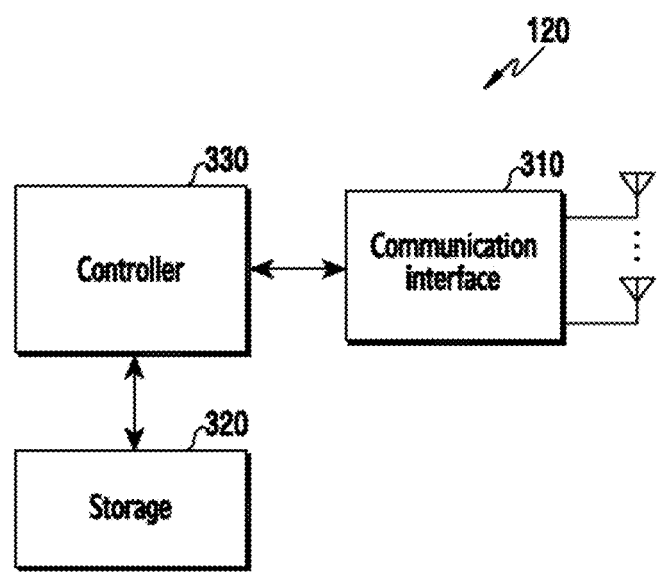
FIG. 3 illustrates the terminal in the wireless communication system according to various embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "communication unit", a "communication module", a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP). According to various embodiments, the controller 330 may control the terminal to perform operations according to the exemplary embodiments of the present disclosure.

Figure 4:
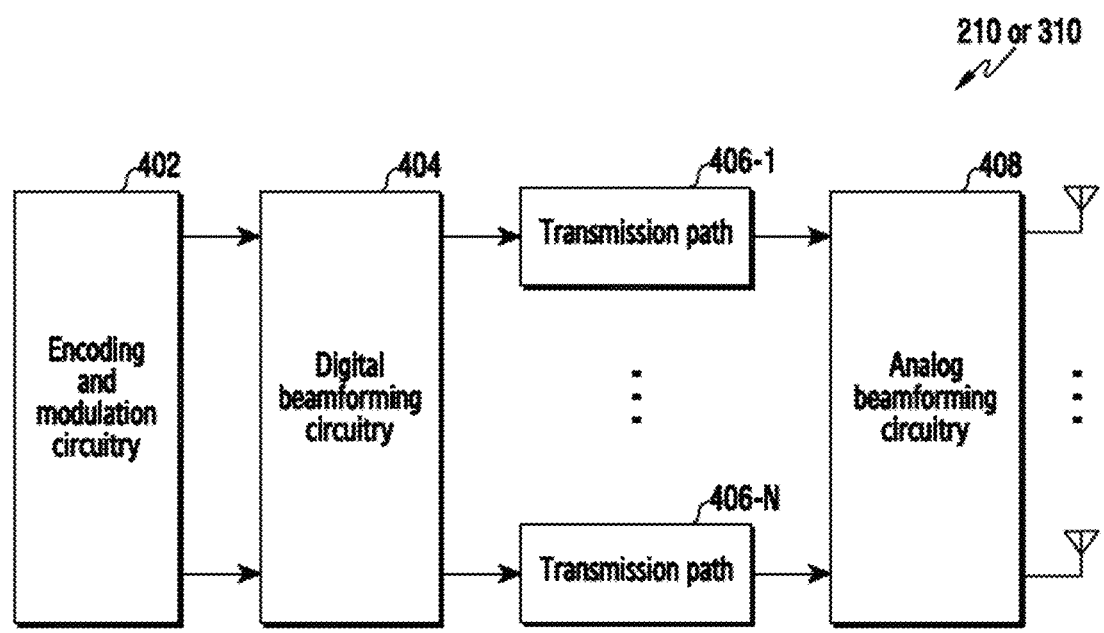
FIG. 4 illustrates the communication interface in the wireless communication system according to various embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier (FBMC)) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

Figure 5:
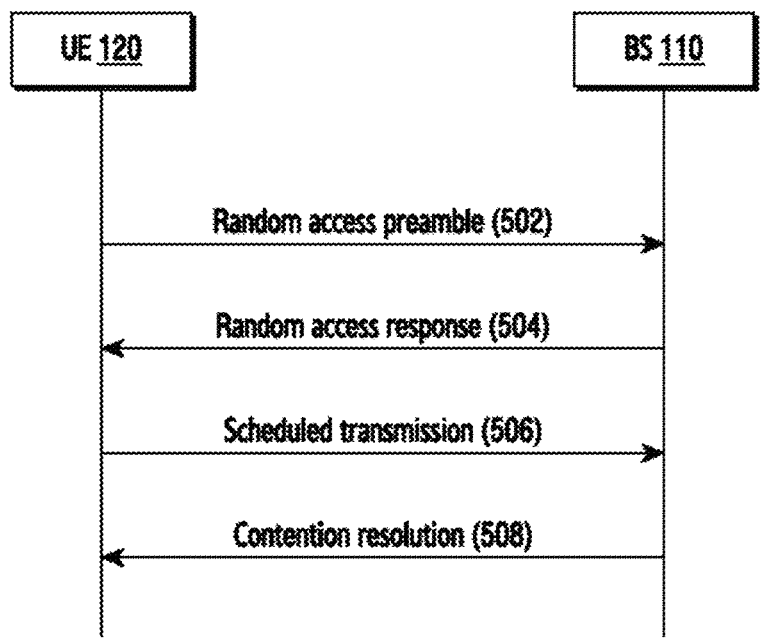
FIG. 5 depicts a contention-based Random Access (CBRA) procedure between a UE and a BS in a wireless network.

FIG. 5 depicts a contention-based random access (CBRA) procedure between a UE 120 and a BS 110 in a wireless network. Initially, at step 502, the UE 120 transmits the random access preamble to the BS 110. In the RA preamble (or Msg1) transmission: The UE 120 selects one of the available 64-$N_{cf}$ contention based random access (RA) preambles, where $N_{cf}$ is the number of RA preambles reserved for contention free access. The contention based RA preambles can be optionally partitioned into two groups. If two groups are configured, the UE 120 selects the group based on size of message 3 it can transmit. The initial RA preamble transmission power can be set based on open loop estimation after compensating for path loss.

Figure 6:
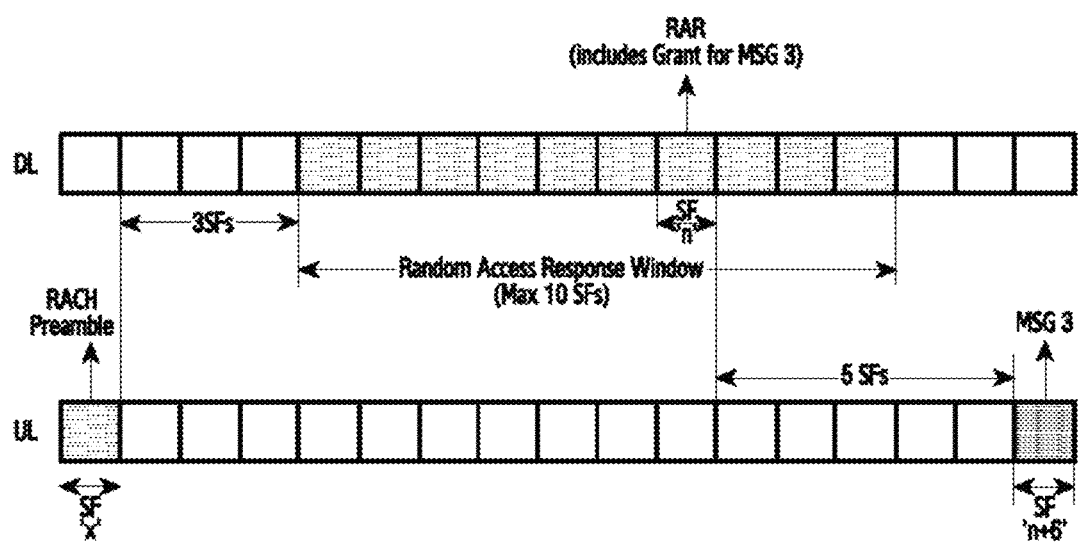
FIG. 6 depicts the Random Access Response (RAR) window starting at subframe 'x+3' for RA preamble transmitted in subframe 'x'.

At step 504, based on the random access preamble, the BS 110 transmits a random access response (RAR) to the UE 120. In the RAR (i.e., Msg2): The BS 110 transmits the RAR on a physical downlink shared channel (PDSCH) addressed to random access—random network temporary identifier (RA-RNTI). The RA-RNTI identifies a time-frequency slot in which RA preamble is detected by the BS 110. The RAR conveys the RA preamble identifier, timing alignment information, temporary C-RNTI and uplink (UL) grant for message 3. Further, the RAR may also include back off indicator to instruct the UE 120 to back off for period of time before retrying the RA attempt. Further, the RAR is transmitted in the RAR window. As shown in FIG. 6, the RAR window starts at subframe 'x+3' for RA preamble transmitted in subframe 'x'. The RAR window size is configurable.

Based on the RAR, at step 506, the UE 120 transmits a scheduled UL transmission on a UL SCH to the BS 110. In the scheduled UL Transmission on the UL SCH (i.e., Msg3): It is used to transmit message such as radio resource control (RRC) connection request, RRC connection re-establishment request, RRC handover confirm, scheduling request, etc. It also includes the UE identity (i.e., C-RNTI or S-TMSI or a random number). A hybrid automatic repeat request (HARQ) can be used for this transmission. This is commonly referred as Msg3.

Based on the scheduled UL transmission, at step 508, the BS 110 transmits a contention resolution message to the UE 120. In the contention resolution message (i.e., Msg 4): The contention resolution message utilizes the HARQ and is addressed to the C-RNTI (if included in the message 3) or temporary C-RNTI (UE identity included in the message 3 is included this case). On successful decoding of this message, a HARQ feedback is only sent by the UE 120, which detects its own UE ID or C-RNTI.

Figure 7:
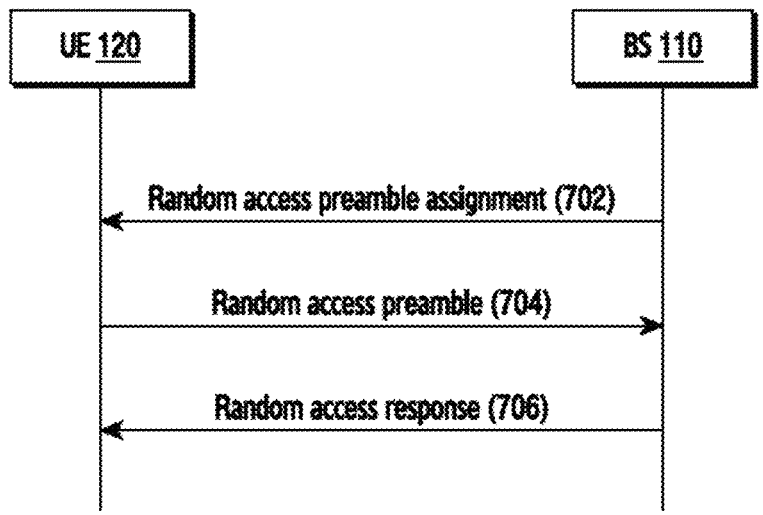
FIG. 7 is a sequence diagram illustrating a contention-free Random Access (CFRA) procedure between the UE and the BS in the wireless network.

FIG. 7 is a sequence diagram illustrating a contention-free RA (CFRA) procedure between the UE 120 and the BS 110 in the wireless network. In the CFRA procedure, at step 702, the BS 110 transmits a random access preamble assignment to the UE 120. Based on the random access preamble assignment, at step 704, the UE 120 transmits the random access preamble to the BS 110. Based on the random access preamble, at step 706, the BS 110 transmits the random access response to the UE 120.

The contention free RA procedure can be used for scenarios such as handover where low latency is required, timing advance establishment for secondary cell (SCell), and so on. The BS 110 assigns non-contention RA preamble to the UE 120 in dedicated signaling. The UE 120 transmits the assigned non-contention RA preamble. The BS 110 transmits the RAR on PDSCH addressed to the RA-RNTI. The RAR conveys RA preamble identifier and Timing alignment information. Further, the RAR may also include UL grant. The RAR is transmitted in the RAR window similar to contention based RA procedure. The contention free RA procedure terminates after receiving the RAR.

Figure 8:
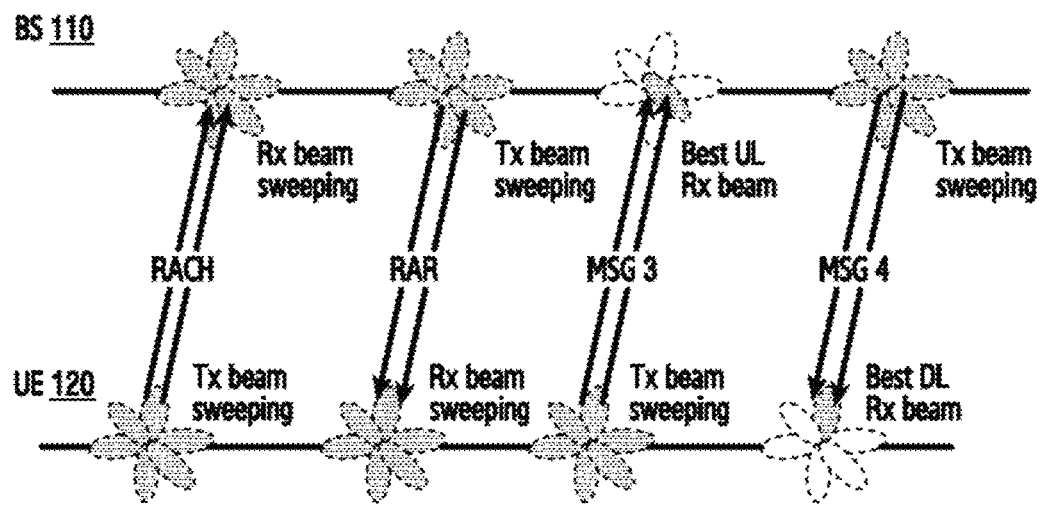
FIG. 8 depicts an example RACH procedure for 5G beamforming systems in the wireless network.

FIG. 8 depicts an example RACH procedure for 5G beamforming systems in the wireless network. This is performed after DL synchronization phase. The UE 120 performs the RACH procedure with a transmission reception point (TRP) inside a cell area that is under control of one BS 110 (e.g., gNB, 5G systems base station) or with a gNB itself. Since the best beams are unknown during initial access, beam sweeping based mechanisms are necessary during the initial access RACH procedures. In the disclosure, a NR refers to "new radio" which is the term used by the 3GPP for discussing activities about the 5G system.

In addition to beamforming, a new feature has been introduced in 5G wireless systems namely wideband operation on the order of 400 MHz. Since large amounts of spectrum are present in the mmWave spectrum for 5G operations, it is possible to utilize them for large data rates operation. In the existing wireless communication system (such as LTE), the bandwidth of the system is limited to 20 MHz and various BW such as 1.4 MHz, 3 MHz, 5 MHz, 10 MHz, and 20 MHz are supported. In this LTE, the BS 110 and the UE 120 must support the same BW. However going forward for the 5G systems, considering the wide available BW in mmWave spectrum and other parts of the spectrum, there is a lot of scope for freely using the large BW. The UE 120 and the BS 110 need not support the same BW and variable BW capable UE may be supported in such deployments. In order to support such wider BW UE, the existing methods disclose efficient mechanisms to support various operations such as search space configurations, efficient resource allocation mechanisms among others. However, such large bandwidth may not be needed at all times. So opportunistically it may be turned on and off. For the case of 5G communications, it is proposed that the UE 120 must support bandwidth on the order of 1 GHz in a single carrier manner. In other words, without using carrier aggregation, a 5G user of the UE 120 must support bandwidths of this order. Several challenges arise in this regard as the 5G user of the UE 120 must support wide bandwidth such as RF, power consumption, scheduling etc. Since the 5G user need not always support such wide bandwidth, the concept of $1^{st}$ and $2^{nd}$ RF bandwidth were introduced. However, the goal is to avoid the user from monitoring wide bandwidth all the time as it is not power efficient. However, there should be ability so configure the users of the UE 120 for such wide bands to support very high data rate requirements. Furthermore, such wide bandwidth is available in above 6 GHz bands and hence can be used effectively.

Figure 9:
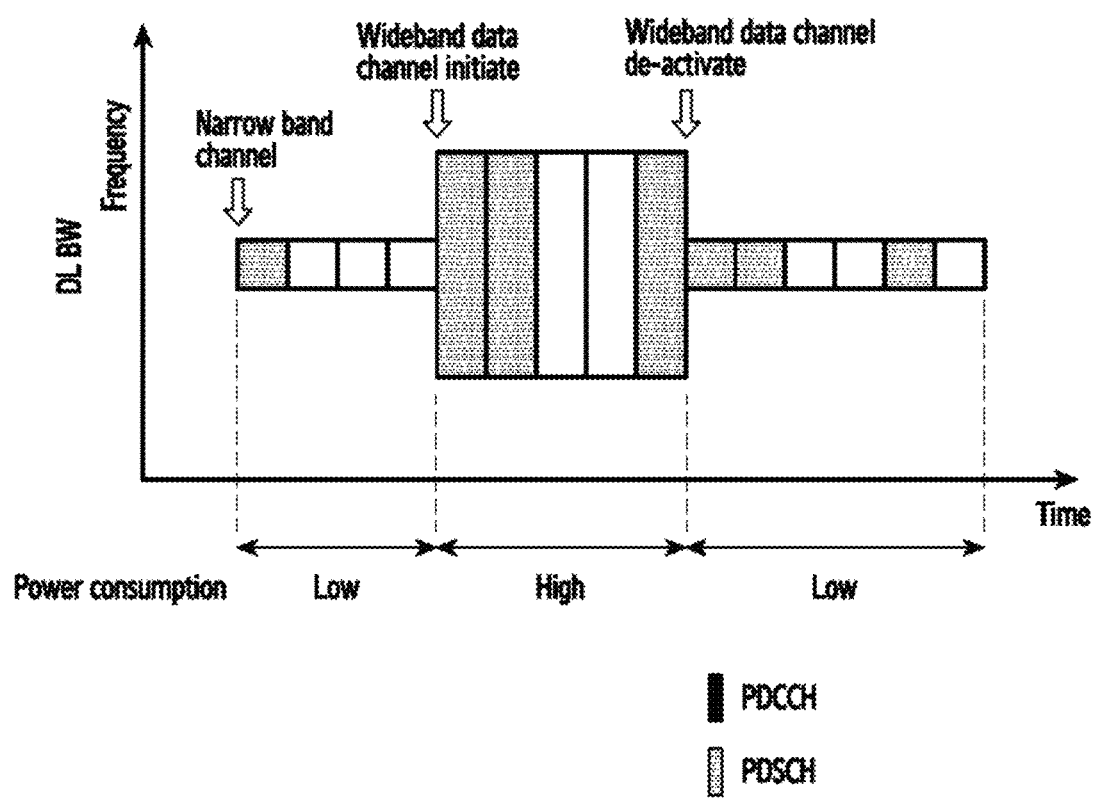
FIG. 9 depicts example illustration where various bandwidths involved in operations of the UE is explained.

FIG. 9 depicts example illustration where various bandwidths involved in operations of the UE 120 are explained. Several aspects of this wideband operation such as configuring search space locations, supporting MU-MIMO for different users with different bandwidth capability sizes, bandwidth indication granularity, resource block group size, PRB bundling granularity, bandwidth configurations and so on, have to be addressed. A generic term known as BWP is defined which indicates a set of contiguous physical resource blocks (PRBs) in a frequency domain, which are configured for the UE 120. The resource allocation will be done within the BWP. Several BWP may be configured to the UE 120 but only one will be activated at a given time instant. Within the BWP, various issues mentioned above have to be addressed since each BWP is configured in a UE-specific manner. Furthermore, when different users are considered for the case of supporting MU-MIMO in a downlink signal, the sizes of the BWP supported by each UE must also be accounted for as it impacts the pre-coding design, the channel and interference estimation as a result of the same etc. Multiple BWPs may be configured and activated to the UE 120 and this entails new operations regarding monitoring timeline, BW sizes supported etc.

Figure 10A:
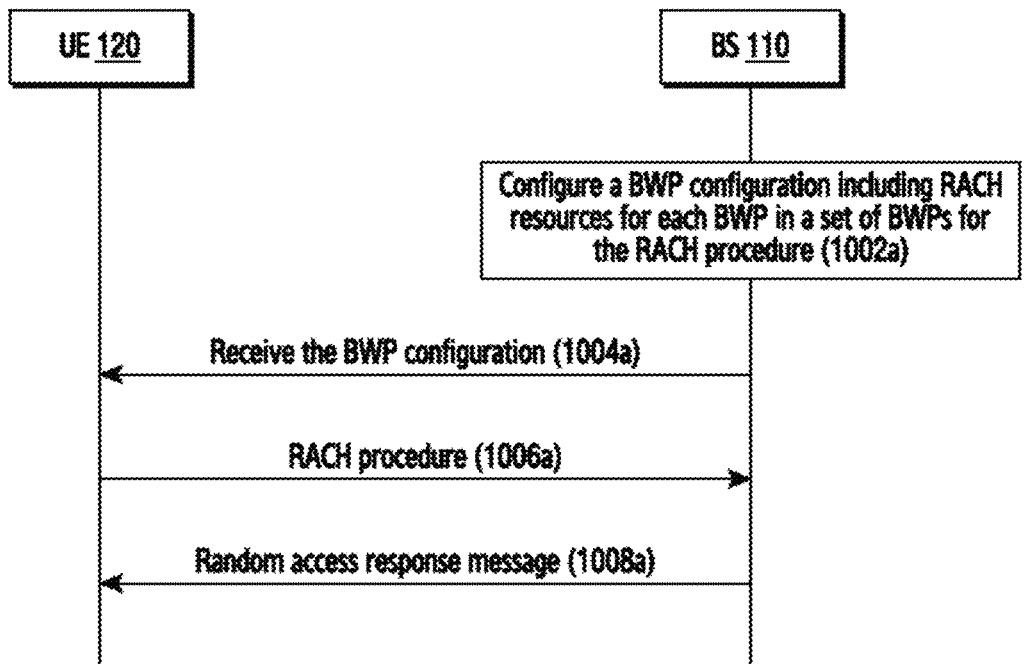
FIG. 10A and FIG. 10B depict sequence diagrams for a RACH resource configuration for the BWP in the wireless network, according to an embodiment as disclosed herein.
Figure 10B:
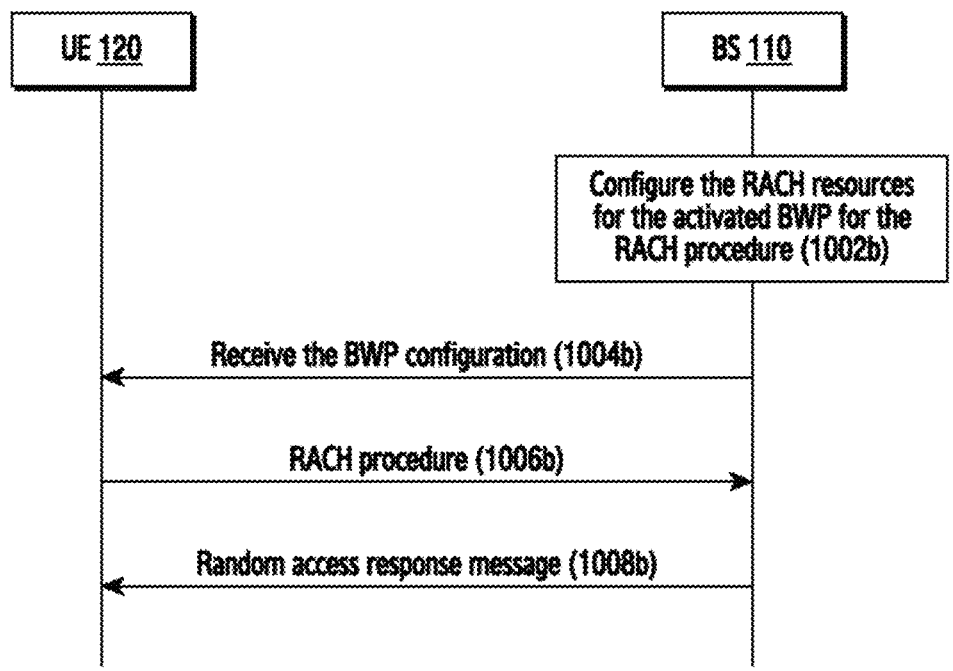

FIG. 10A and FIG. 10B depict sequence diagrams for a RACH resource configuration for the BWP in the wireless network, according to an embodiment as disclosed herein. The wireless network includes the UE 120 and the BS 110 communicated with the each other. The UE 120 can be, for example but not limited to, a cellular phone, a tablet, a smart phone, a laptop, a personal digital assistant (PDA), a global positioning system, a multimedia device, a video device, a game console, or the like. The UE 120 may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like. The UE 120 is compliant with multiple, different communication protocols that can operate as a multi-mode device by communicating within the 5G system. The BS 110 may also be referred to as a base transceiver station, a radio base station, a radio transceiver, a transceiver function, a basic service set (BSS), an extended service set (ESS), an eNB, a gNB or the like.

In the FIG. 10A, at step 1002a, the BS 110 configures the BWP configuration comprising the RACH resources for each BWP in the set of BWPs for the RACH procedure. Further, the BS 110 indicates the RACH resource for each of the BWPs in the set of BWPs to the UE 120. Based on the indication, at step 1004a, the UE 120 receives the BWP configuration comprising the RACH resources for each BWP in the set of BWPs for the RACH procedure from the BS 110.

Further, at step 1006a, the UE 120 performs the RACH procedure on the selected BWP from the set of BWPs using the RACH resources for the selected BWP indicated in the BWP configuration. Further, at step 1008a, the UE 120 receives the RAR message on the selected BWP from the BS 110.

As shown in the FIG. 10B, the BS 110 activates the selected BWP from the set of BWPs when the UE 120 attempts to establish the RRC connection with the BS 110 for the RACH procedure. At step 1002b, The BS 110 configures the RACH resources for the activated BWP for the RACH procedure. Further, the BS 110 indicates the RACH resource for the activated BWP in the UE 120.

Based on the indication, at step 1004b, the UE 120 receives the BWP configuration comprising RACH resources for the active BWP from the BS 110. Further, at step 1006b, the UE 120 performs the RACH procedure on the active BWP using the RACH resources for the active BWP. Further, at step 1008b, the UE 120 receives the RAR message on the active BWP from the BS 110.

Further, for each UE-specific serving cell, one or more DL BWPs and one or more UL BWPs can be configured by dedicated RRC for the UE 120. For the case of the PCell, this can be done as part of the RRC connection establishment procedure. For the SCell, this can be done via the RRC configuration, which also indicates the SCell parameters. When the UE 120 receives a SCell activation command, there should be a default DL and/or UL BWP which must be activated since there must be at least one DL and/or UL BWP which must be monitored by the UE 120 depending on the properties of the SCell (e.g., DL only or UL only or combination of DL and UL). This BWP, which must be activated upon receiving the SCell activation command, can be informed to the UE 120 via the same RRC configuration, which configured the BWP on this serving cell. For the SCell, the RRC signaling for the SCell configuration/reconfiguration can be used for indicating the default DL BWP on the SCell, which can be used for fallback purposes. Also note that this default DL BWP can be same or different from the initially activated DL/UL BWP, which is indicated to the UE 120 as part of the SCell configuration. Similarly a default UL BWP can be configured to the UE 120 for the case of transmitting PUCCH for scheduling request (SR) (as an example), in case the PUCCH resources are not configured in every BWP for the sake of SR. Hence different types of BWP may be configured to the UE 120 and it will be monitoring one of them actively in PCell and/or SCell.

Considering these multiple BWP and their presence in the PCell and/or the SCell, the UE 120 needs to perform random access procedure in the SCell when the UE 120 receives a PDCCH order. Note that the PRACH procedure in the PCell is such that the UE 120 performs the RACH in a certain UL BWP depending on the availability of the PRACH resources which is also discussed in the disclosure and receives the Msg2 response either in following at least one of:

a) Current active BWP on the primary cell (PCell);
b) The initial active BWP on the primary cell;
c) The default BWP configured to the UE 120 on the primary cell;
d) One of the multiple active BWPs (in case UE 120 supports multiple active BWP) whose index is given to the UE 120, and the index of BWP is related to the RACH resource and/or preamble chosen by the UE 120; or
e) Combination of these approaches can be used depending on UE capability.

Further, the numerology (e.g., SCS) of Msg2 follows the numerology of the BWP configured for the UE 120, which can be one of the above options, where the UE 120 will monitor Msg2 which will be indicated to the UE 120 by the BS 110. This configuration can be either pre-defined or configured via the RMSI or via UE specific higher layer signaling. Accordingly, the UE 120 will monitor for the Msg2. Consider, the UE 120 performs the contention free RACH procedure performed in the connected mode. In case, the UE 120 is configured with one BWP, the UE 120 sends the Msg1 on the UL initial active BWP (or UL default BWP as indicated to the UE 120 and depending on where the contention free random access (CFRA) resources are is received for performing contention free RACH—indicated to the UE 120 via the RMSI/UE specific higher layer signaling) then the UE 120 comes back to its current DL active BWP for Msg2 monitoring (both frequency-division duplexing (FDD) and time-division duplexing (TDD) cases), then numerology for Msg2 follows numerology of this BWP. The Msg2 is then sent on a common search space (CSS) if it is configured in that BWP or it will be sent via a UE-specific search space (USS), which is configured in every BWP. The PDCCH order is received in active BWP (or one of the multiple active BWPs) on the PCell. The numerology for the PDCCH order is same as that of active BWP on the PCell. Msg2 can have one of the following options:

Option 1: The numerology for receiving PDCCH for the RAR and PDSCH for RAR is same as UE's active BWP on the PCell.
Option 2: The numerology for receiving PDCCH for the RAR is same as numerology of UE's active BWP.

Numerology of PDSCH for RAR is same as numerology of BWP in which PDSCH is scheduled by the PDCCH for the RAR.

Option 3: The numerology for receiving PDCCH for RAR and PDSCH for RAR is as configured in the RMSI.

The above options extend for the case of physical random access channel (PRACH) procedure on the PSCell as well i.e., in the case of dual connectivity.

For Msg1 for the contention-free case, the configuration is either given in the RMSI or the handover command. The BWP/UL location for CFRA resources is also given in the handover command/RMSI. Accordingly, the SCS is used by the UE 120.

For an initial access case, and the contention based RACH performed in a connected mode, since the UE 120 identity is not known; only the initial active BWP is used by the BS 110 for sending Msg2 and other responses. The numerology for various steps follows the configuration of the Msg2.

In order to support the case where the UE 120 may be configured with multiple active BWP, and to account for the fact that the TA difference across BWP can be different, the UE 120 may be requested to perform RACH on a specific BWP. In such cases, the BS 110 can configure the RACH resources on each BWP. The RACH resources on per BWP basis can be indicated to the UE 120 via a) an RMSI which is the system information container;
b) a BWP configuration procedure via an RRC indication; and
c) a BWP activation mechanism via DCI.

Then, the UE 120 performs the RACH on the specific BWP and receives Msg2 and other responses on the corresponding BWP. Since, the UE 120 need not perform RACH on all BWP at initial access besides the initial active BWP, the configuration via above options (b) and (c) are more reasonable. Else the TA value on different BWP can follow the below mechanisms:

a) Use the same TA value as the initial active BWP,
b) Use TA=0 for all BWP other than initial active BWP,
c) Use a pre-configured max TA value that accounts for the cell size and the frequency variations across the various BWPs,
d) Use the same TA value for all BWPs supported within the same TXRU and a different TA value for BWPs belonging to other TXRUs as indicated by a next generation NodeB (gNB). This value may be derived based on some QCL assumptions between the multiple TXRUs. For instance, all TXRUs that are QCL'ed with the TXRU, which has the initial RACH BWP may use the same TA value. Others may use a TA value which differs based on the difference in the delay spread observed in the past/TA=0/max configured TA value,
e) Indicate the TA value or TA adjustment in the BWP configuration, and
f) All BWPs which are associated with one SS block will use same TA value (similar to TAG group).

The absolute delay (e.g., propagation delay and the delay from the channel) between the UE 120 and BS 110 is independent of the SCS used for UL transmission. However, a receiver can estimate the TA value in finer granularity when higher SCS is used i.e., the step size of TA can change based on the SCS used in the Msg1 for initial access and the SCS used by UL transmission during connected mode (using which the gNB constantly evaluates TA).

But, the TA value that can be applied by the UE 120 is limited by the SCS used for Msg3 in the initial access and by the subsequent UL transmissions in the connected mode (i.e., after estimation of TA). Hence, the TA value step size to be indicated should be dependent on the SCS of Msg3 during initial access and subsequent UL transmissions for connected mode.

The following cases can arise:
a) Msg1 uses higher SCS while Msg3 uses lower SCS→although the TA estimation can be finer, the indication is limited by the lower SCS granularity i.e., Msg3 SCS, and
b) Msg1 uses lower SCS while Msg3 uses higher SCS→TA estimation is coarse compared to the Msg3 numerology. Therefore the indication is in terms of multiple symbols of the Msg3 SCS.

Similarly, when multiple BWP with different numerologies are involved, the TA indication can be either indicated in terms of the lowest or the highest sub-carrier spacing among all these multiple active BWPs.

The above description is generic for CBRA and CFRA RACH procedures. The TA value can be indicated to UE in terms of:

a. The Random access Preamble numerology of the preamble format used by the UE 120 and configured in the BWP configuration (for both CBRA and CFRA),
b. a Scheduled Transmission numerology configured for the UE in a RMSI,
c. an ongoing UL data transmission numerology in a primary cell in case of a contention free RACH in the primary cell,
d. an ongoing UL data transmission numerology in a SCell since Msg2 will be received in the PCell for the case of CFRA on the SCell
e. a numerology configured for the Supplementary Uplink (SUL) carrier, and
f. a numerology commonly chosen among multiple bandwidth parts in the case of multiple simultaneously active bandwidth parts.

Figure 11:
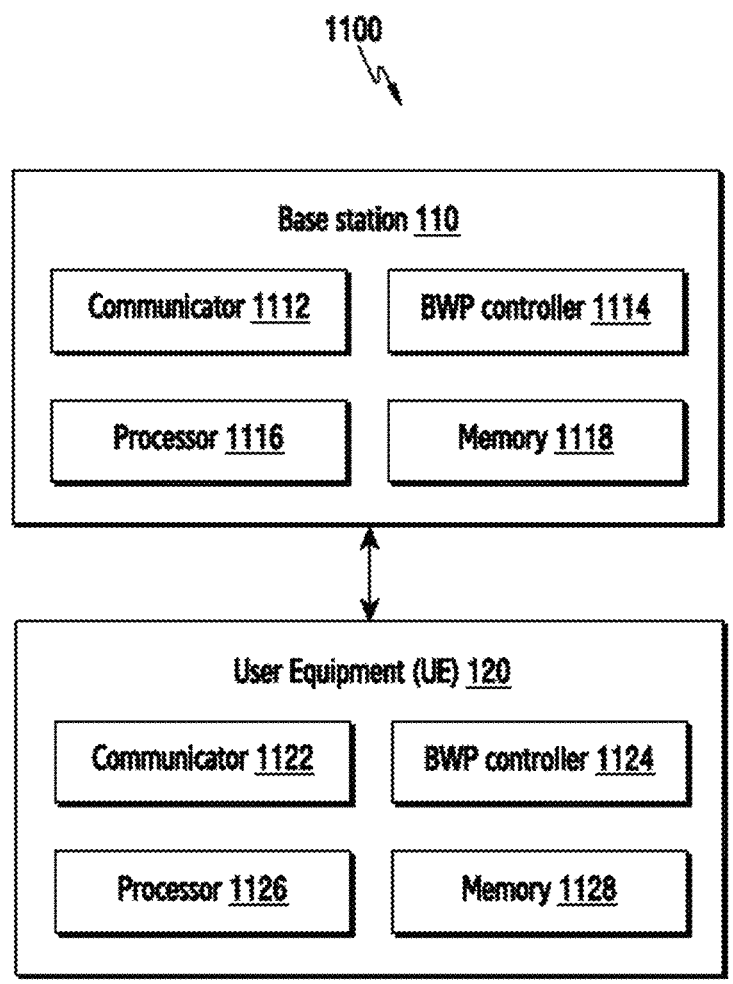
FIG. 11 is an overview of a system for handling BWP configurations for the RACH procedure in the wireless network, according to an embodiment as disclosed herein.

FIG. 11 is an overview of a system 1100 for handling BWP configurations for the RACH procedure in the wireless network, according to an embodiment as disclosed herein. The system 1100 includes the UE 120 and the BS 110 communicated with the each other.

In an embodiment, the BS 110 includes a communicator 1112, a BWP controller 1114, a processor 1116, and a memory 1118. In an embodiment, the BWP controller 1114 configures the BWP configuration comprising RACH resources for each BWP in the set of BWPs for the RACH procedure. After configuring the BWP configuration comprising the RACH resources for each BWP in the set of BWPs for the RACH procedure, the BWP controller 1114 indicates the RACH resource for each of the BWPs in the set of BWPs to the UE 120.

In an embodiment, the RACH resource for each of the BWPs is indicated to the UE 120 using at least one of the RMSI, the BWP configuration procedure via the RRC indication, and the BWP activation mechanism via the DCI.

In an example, the RMSI (i.e. SIB1) including the RACH configuration for the initial BWP is depicted below:

```
SIB1 ::=            SEQUENCE {
:
       uplinkConfigCommon    UplinkConfigCommon :
}
 UplinkConfigCommon ::=                   SEQUENCE {
       -- Absolute uplink frequency configuration and subcarrier specific virtual
carriers.
       frequencyInfoUL       FrequencyInfoUL
       OPTIONAL, -- Cond InterFreqHOAndServCellAdd
       -- The initial uplink BWP configuration for a SpCell (PCell of MCG or SCG).
Corresponds to L1 parameter 'initial-UL-BWP'.
       -- (see 38.331, section FFS_Section).
       initialUplinkBWP   BWP-UplinkCommon
}
BWP-UplinkCommon ::=                     SEQUENCE {
    :     -- Configuration of cell specific random access parameters which the UE
uses for contention based and contention free random access
       -- as well as for contention based beam failure recovery.
       rach-ConfigCommon                           SetupRelease  { RACH-
ConfigCommon}
}
```

In an example, the RACH configuration in each BWP using dedicated signaling is explained below:

```
RRCReconfiguration-IEs ::=               SEQUENCE {
       -- Configuration of Radio Bearers (DRBs, SRBs) including SDAP/PDCP.
-- In EN-DC this field may only be present if the RRCReconfiguration
       -- is transmitted over SRB3.
       radioBearerConfig
       OPTIONAL, -- Need M
       -- Configuration of secondary cell group (EN-DC):
       secondaryCellGroup OCTET STRING (CONTAINING CellGroupConfig)
                                   OPTIONAL, -- Need M
       measConfig      MeasConfig
          OPTIONAL, -- Need M
       lateNonCriticalExtension              OCTET STRING
       OPTIONAL,
       nonCriticalExtension   SEQUENCE { }
              OPTIONAL
}
CellGroupConfig information element
-- Serving cell specific MAC and PHY parameters for a SpCell:
SpCellConfig ::=                         SEQUENCE {
       -- Serving cell ID of a PSCell (the PCell of the Master Cell Group uses ID = 0)
       servCellIndex
       OPTIONAL, -- Cond SCG
       -- Parameters for the synchronous reconfiguration to the target SpCell:
       reconfigurationWithSync
       OPTIONAL, -- Cond ReconfWithSync
       rlf-TimersAndConstants              SetupRelease  { RLF-
TimersAndConstants }
       OPTIONAL, -- Need M
       rlmInSyncOutOfSyncThreshold INTEGER (0..1)
       OPTIONAL, -- Need M
       spCellConfigDedicated    ServingCellConfig
       OPTIONAL, -- Need M
       ...
}
```

ServingCellConfig: The ServingCellConfig IE is used to configure (add or modify) the UE 120 with the serving cell, which may be the SpCell or the SCell of an MCG or SCG.

In an example, the ServingCellConfig information element is explained below:

```
-- ASN1START
-- TAG-SERVING-CELL-CONFIG-START
ServingCellConfig ::=       SEQUENCE {
:
uplinkConfig
  :
UplinkConfig ::=                SEQUENCE {
  :
    -- The additional bandwidth parts for uplink.
    uplinkBWP-ToAddModList          SEQUENCE (SIZE
(1..maxNrofBWPs)) OF BWP-Uplink
}
-- TAG-SERVING-CELL-CONFIG-STOP
-- ASN1STOP
```

In an example, the BWP information element is explained below:

```
-- ASN1START
-- TAG-BANDWIDTH-PART-START
-- Generic parameters used in Uplink- and Downlink bandwidth parts
BWP ::=                      SEQUENCE {
    locationAndBandwidth     INTEGER (0..37949),
    subcarrierSpacing        SubcarrierSpacing,
    cyclicPrefix             ENUMERATED { extended }
        OPTIONAL -- Need R
}
BWP-Uplink ::=               SEQUENCE {
    bwp-Id                                  BWP-Id,
    bwp-Common                              BWP-
UplinkCommon
    ...
}
BWP-UplinkCommon ::=         SEQUENCE {
    genericParameters         BWP,
    -- Configuration of cell specific random access parameters
which the UE uses for contention based and contention free random
access
    -- as well as for contention based beam failure recovery.
    rach-ConfigCommon           SetupRelease { RACH-
ConfigCommon }
}
}
```

In an embodiment, each of the BWPs in the set of BWPs is associated with one of same numerology and different numerology.

In an embodiment, for each DL BWP in a set of DL BWPs on the primary cell, the UE 120 can be configured control the resource sets for every type of common search space and for UE-specific search space. Further, the UE 120 is not expected to be configured without the common search space on the PCell, or on the PSCell, in the active DL BWP so that the UE 120 can avoid the retuning.

Further, the BWP controller 1114 is configured to indicate the TA value to the UE 120 upon completion of the RACH procedure. The TA value is indicated to the UE with reference to the granularity of the numerology used by one of a) Random access Preamble numerology of a preamble format used by the UE 120 and configured in the BWP configuration, b) the Scheduled Transmission numerology configured for the UE 120 in the RMSI, c) the ongoing UL data transmission numerology in a primary cell in case of a contention free RACH in the primary cell, d) an ongoing UL data transmission numerology in a secondary cell, e) the numerology configured for the SUL carrier, and f) the numerology commonly chosen among multiple bandwidth parts in the case of multiple simultaneously active bandwidth parts.

In an embodiment, a granularity of the TA value depends on the numerology of a first UL transmission after receiving a random access response (RAR).

In an example, in case of random access response, the TA command [11, TS 38.321], $T_A$, for a TAG indicates $N_{TA}$ values by index values of $T_A$=0, 1, 2, . . . , 3846 where an amount of the time alignment for the TAG for subcarrier spacing of $2^\mu \cdot 15$ kHz is given by $N_{TA} = T_A \cdot 16 \cdot 64/2^\mu$. $N_{TA}$ is defined in [4, TS 38.211] and is relative to the subcarrier spacing of the first uplink transmission from the UE after the reception of the random access response.

In another embodiment, the BWP controller 1114 activates the selected BWP from the set of BWPs when the UE 120 attempts to establish the RRC connection with the BS 110 for the RACH procedure. Further, the BWP controller 1114 configures the RACH resources for the activated BWP for the RACH procedure. After configuring the RACH resources for the activated BWP for the RACH procedure, the BWP controller 1114 indicates the RACH resource for the activated BWP in the UE 120.

In another embodiment, the BWP controller 1114 includes a BWP configuration controller, a RACH resource indicator, a TA value indicator, a BWP activator to handle the BWP configurations for the RACH procedure in the wireless network.

The processor 1116 is configured to execute instructions stored in the memory 1118 and to perform various processes. The communicator 1112 is configured for communicating internally between internal hardware components and with external devices via one or more networks. The communicator 1112 is configured for communicating with the BWP controller 210 to handle the BWP configurations for the RACH procedure in the wireless network.

The memory 1118 also stores instructions to be executed by the processor 1116. The memory 1118 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 1118 may, in some examples, be considered a non-transitory storage medium. The term "non-transitory" may indicate that the storage medium is not embodied in a carrier wave or a propagated signal. However, the term "non-transitory" should not be interpreted that the memory 1118 is non-movable. In some examples, the memory 1118 can be configured to store larger amounts of information than the memory. In certain examples, a non-transitory storage medium may store data that can, over time, change (e.g., in Random Access Memory (RAM) or cache).

In an embodiment, the UE 120 includes a communicator 1122, a BWP controller 1124, a processor 1126, and a memory 1128. The BWP controller 1124 receives the BWP configuration comprising RACH resources for each BWP in the set of BWPs for the RACH procedure from the BS 110. Further, the BWP controller 1124 performs the RACH procedure on the selected BWP from the set of BWPs using the RACH resources for the selected BWP indicated in the BWP configuration. After performing the RACH procedure on the selected BWP from the set of BWPs, the BWP controller 1124 receives the Random access response message on the selected BWP from the BS.

In an embodiment, the RACH resource for each of the BWPs is received by the UE 120 using at least one of the RMSI, the BWP configuration procedure via the RRC indication, and the BWP activation mechanism via the DCI.

In an embodiment, the BWP controller 110 receives the Random access response message on the selected BWP from the BS 110 in at least one of a) a current active BWP on the primary cell, b) an initial active BWP on the primary cell, c) a default BWP configured to the UE 120 on the primary cell, and one of multiple active BWPs when the UE 120 supports multiple active BWPs, where each index of the supported multiple active BWPs is provided to the UE 120 by the BS 110, and the index of BWP is related to the RACH resource and/or preamble chosen by the UE 120.

In another embodiment, the BWP controller 1124 establishes the RRC connection on the active BWP. Further, the BWP controller 1124 receives the BWP configuration comprising RACH resources for the active BWP from the BS 110. Further, the BWP controller 1124 performs the RACH procedure on the active BWP using the RACH resources for the active BWP. Further, the BWP controller 1124 receives the random access response message on the active BWP from the BS 110.

In an embodiment, the UE 120 performs the RACH procedure on the active bandwidth part when the RACH resources are available. In another embodiment, the UE 120 switches to a default bandwidth part or the initial active BWP from the set of BWPs, when the RACH resources are not available in the active bandwidth part.

The processor 1126 is configured to execute instructions stored in the memory 1128 and to perform various processes. The communicator 1122 is configured for communicating internally between internal hardware components and with external devices via one or more networks. The communicator 1122 is configured for communicating with the BWP controller 1124 to handle the BWP configurations for the RACH procedure in the wireless network.

The memory 1128 also stores instructions to be executed by the processor 1126. The memory 1128 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 1128 may, in some examples, be considered a non-transitory storage medium. The term "non-transitory" may indicate that the storage medium is not embodied in a carrier wave or a propagated signal. However, the term "non-transitory" should not be interpreted that the memory 1128 is non-movable. In some examples, the memory 1128 can be configured to store larger amounts of information than the memory. In certain examples, a non-transitory storage medium may store data that can, over time, change (e.g., in random access memory (RAM) or cache).

Although the FIG. 11 shows various hardware components of the system 1100 but it is to be understood that other embodiments are not limited thereon. In other embodiments, the system 1100 may include less or more number of components. Further, the labels or names of the components are used only for illustrative purpose and does not limit the scope of the disclosure. One or more components can be combined together to perform same or substantially similar function to handle the BWP configurations for the RACH procedure in the wireless network.

Figure 12A:
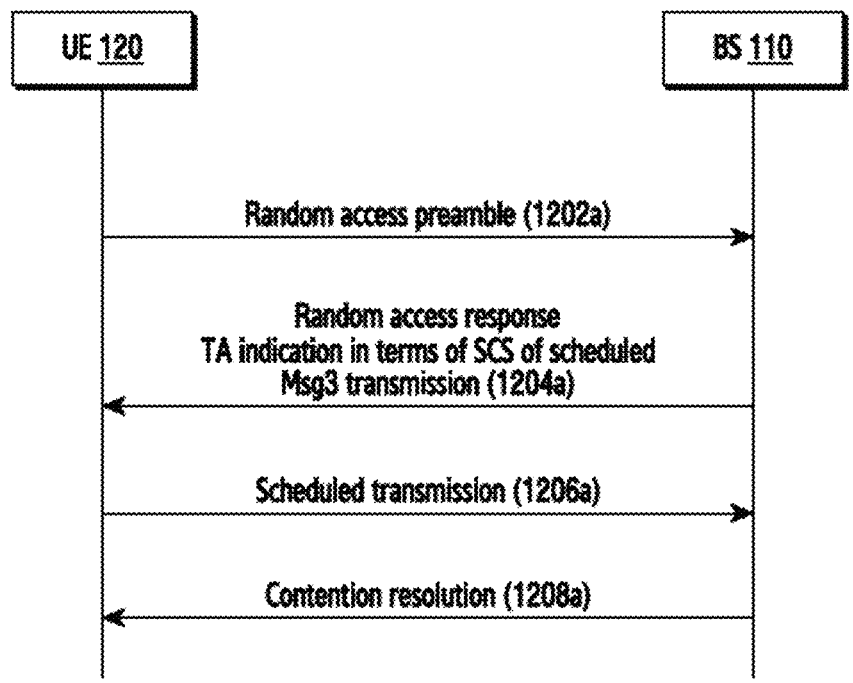
FIGS. 12A and 12B depict example TA indication mechanisms between the UE and BS in the wireless network, according to an embodiment as disclosed herein.
Figure 12B:
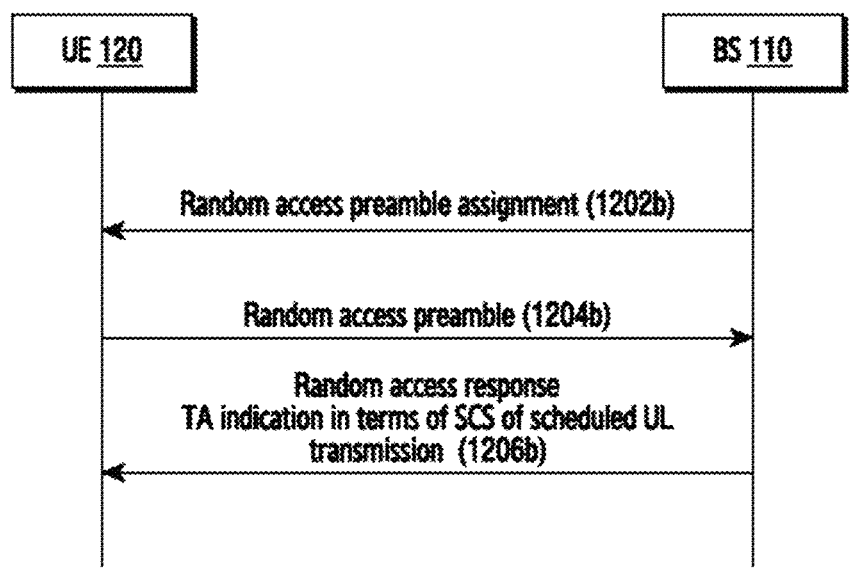

FIGS. 12A and 12B depict example TA indication mechanisms between the UE 120 and BS 110 in the wireless network, according to an embodiment as disclosed herein.

As shown in the FIG. 12A, at step 1202a, the UE 120 transmits the random access preamble to the BS 110. Based on the random access preamble, at step 1204a, the BS 110 sends the RAR to the UE 120. The RAR includes the TA indication in terms of SCS of scheduled Msg3 transmission. Based on the RAR, at step 1206a, the UE 120 transmits the scheduled UL transmission on the UL SCH to the BS 110. Based on the scheduled UL transmission, at step 1208a, the BS 110 sends a contention resolution message to the UE 120.

As shown in the FIG. 12B, In the CFRA procedure, at step 1202b, the BS 110 sends the random access preamble assignment to the UE 120. Based on the random access preamble assignment, at step 1204b, the UE 120 sends the random access preamble to the BS 110. Based on the random access preamble, at step 1207b, the BS 110 sends the random access response to the UE 120. The random access response includes TA indication in terms of SCS of scheduled UL transmission.

Embodiments herein disclose the numerology for the RACH procedure performed on the SCell. The PDCCH order is received in the active BWP of the scheduling cell of TAG to which the SCell belongs. The numerology for the PDCCH order is same as that of active BWP of scheduling cell of TAG to which the SCell belongs. Therefore, PDCCH for the RAR and PDSCH for the RAR are received on PCell in this case. Therefore, the following options can be considered for the numerology configurations:

Option 1: The numerology for receiving PDCCH for RAR and PDSCH for RAR is same as the UE's active BWP on the PCell, Option 2: The numerology for receiving PDCCH for RAR is same as numerology of the UE's active BWP on PCell. Numerology of PDSCH for RAR is same as numerology of BWP in which PDSCH is scheduled by PDCCH for RAR.

Option 3: Numerology for receiving PDCCH for RAR and PDSCH for RAR is as configured in RMSI This scheduling cell can be PCell/PSCell. The above options for SCell RAR can be following PCell or PSCell numerology of the BWP configured and follows the options above.

CORESET configurations for RACH-CFRA and CBRA: The coreset for RAR in initial access can be configured by the RMSI. This configuration to avoid too much overhead can have same properties as the RMSI CORESET. Except the periodicity of this RAR coreset could be smaller than RMSI/different from RMSI to meet control plane latency. Hence to indicate RAR coreset, only the CORESET monitoring periodicity can be indicated to the UE 120 via the RMSI. This periodicity can be 2/4/7/14 symbols and hence 2 bits can be sufficient to indicate the RAR CORESET configurations to the UE 120. Rest other properties of search space design, interleaver design, REG bundle etc. need not change between RMSI CORESET and RAR CORESET. Reusing the CORESET configuration by MIB for OSI/paging as well and for RAR CORESET is feasible. To reuse the CORESET configuration by MIB for multiple purposes, Orthogonal frequency-division multiplexing (OFDM) symbol numbers in slot are configured in MIB and commonly applicable to SIBx/paging/RAR CORESET but the slot-timing (slot periodicity & offset) is separately configured for different x and paging and for RAR. This approach is indeed similar to SIBx timing configuration in the LTE. The common search space (or common search space CORESET) is placed in every subframe, but the SIBx slot timing is indicated in SIB2 for all x>2. So that, the RMSI carries only the periodicity and the slot offset for RAR CORESET configurations.

Further, the CORESET is typically characterized by slot timing, the OFDM symbol numbers in each slot, and frequency resources. For simplicity, it is proposed that the OFDM symbol numbers and frequency resources be commonly applicable to RAR and RMSI, and the slot timing can be individually determined/indicated for the RAR and the RMSI. The PBCH indicates the following information for the CORESET: #1) frequency resources; #2) OFDM symbol numbers in each slot; and #3) RMSI slot timing e.g., in terms of slot offset and periodicity. And similarly, the RMSI indicates only (3) for RAR configuration i.e., RAR CORESET slot timing. Information #1 and #2 can be reused for type0 CSS, i.e., at least for RAR and RMSI transmissions; while information #3 is only for RMSI transmissions and RAR transmission specific.

For RAR CORESET, frequency location is same as RMSI CORESET. The RAR is monitored in time using following information. The following could be configuration for CORESET, which can be shared between the RMSI and the RAR.

Timing information can be as follows:

Periodicity: For the CSS, the periodicity does not need to be explicitly configured in PBCH. It is noted that for individual SIBx, RAR, this periodicity and SSB-common slot offset can be signaled or fixed in the spec.

Slot location: The CSS CORESETs may come as a burst set similarly to SSB set, and the individual CSS CORESET slot location can be determined as $n_s = o_{common} + f(n_{ss}, i_{ss}, \Delta_{ss})$ $o_{common}$: a common offset for all the CSS CORESETs (i.e., starting slot number of the CSS CORESET burst), may be configured in RMSI/OSI, which could be either frame or half-frame boundary. Note that $O_{common}$ for RMSI CORESETs needs to be provided in PBCH, $i_{ss}$: SSB index, $n_{ss}$: Slot number to map SSB is in SSB numerology, and $\Delta_{ss}$: SSB-specific offset provided in the PBCH.

OFDM symbol indices: OFDM symbols in a slot for a CORESET that should be monitored when UE detects an SSB $i_{ss}$. The symbol indices need to be indicated in the MIB.

Therefore, for RAR scheduling, the RMSI will indicate to the UE 120: slot location of CORESET, OFDM symbol locations of a CORESET specific for RAR, CORESET periodicity. The number of bits for the same can be limited to 2 or 3. For RAR, the below mentioned can be followed:

Slot location: can be determined as $n_s = O_{RAR} + f(n_{ss}, i_{ss}, \Delta_{ss})$, and $O_{RAR} \in \{0, o_1\}$, where $o_1$ is the number of slots in a half frame according to the configured RAR numerology.

When $O_{RAR} = 0$, the RAR and SS blocks are mapped in FDM manner.

Depending on how many CORESETs are mapped per slot, slot or non-slot transmissions for RAR, different function $f(n_{ss}, i_{ss}, \Delta_{ss})$ may be used.

OFDM symbol indices: can be determined as a function of at least one of numerology, number of CORESETs per slot, $i_{ss}$, and $\Delta_{ss}$.

Figure 13:
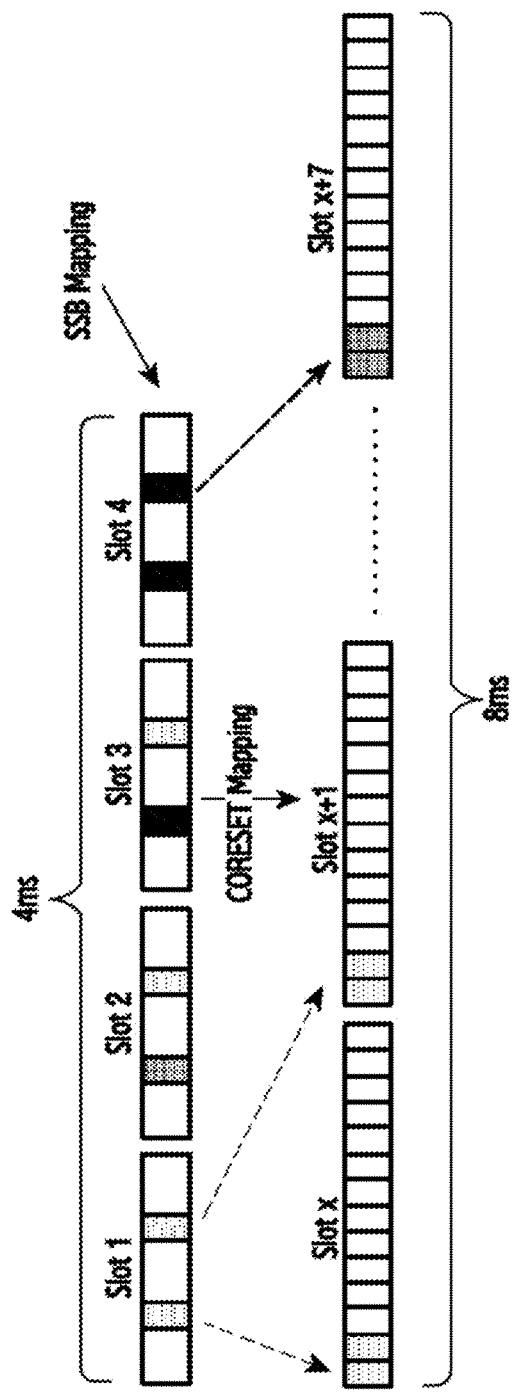
FIG. 13 depicts a CORESET mapping for RAR to support slot-based scheduling, according to embodiments as disclosed herein.

Consider the case of 15 kHz SCS with L=8 SSB. In this case, the SS burst set occupies 4 ms, with 2 SSB within 1 slot. Then based on the RAR agreement, only 1 CORESET per slot is configured for RAR purposes. This means that 8 ms will be needed only to monitor CORESETs for RAR purposes. This design can totally not meet the control plane latency requirements as shown in the FIG. 13. FIG. 13 depicts the CORESET mapping for the RAR to support slot-based scheduling. The fully shaded box indicates the SSB and the shaded boxes indicate the CORESET locations for each SSB (for ease, the time duration is taken as 2 symbols).

While at the current stage it may seem that such a deployment should be avoided by the network vendors, the RAN1 specification must account for the worst case designs. Hence, to avoid such cases, the RAN1 should consider RAR scheduling on a non-slot basis as well. Such an agreement will also match the RMSI scheduling agreement made in the last RAN1 meeting.

Furthermore, as mentioned above, the RAR CORESET design can follow properties of the RMSI except for different time durations and periodicity. Slot locations, number of CORESETs per slot and OFDM symbol indices are indicated via RMSI to configure RAR CORESET. Rest of the configuration follows from the RMSI CORESET configuration.

The Msg4 CORESET (same as RAR/configured by RAR) can follow same properties as above. The CORESET monitoring periodicity for Msg4 can be greater than that of Msg2, at least equal to or greater than Msg2. Only this value can be indicated via Msg2 to reduce Msg2 payload size. The search space being used for Msg4 indication can be common search space or UE specific search space. In case it is USS, it is indexed by T-CRNTI. Msg4 CORESET can be indicated via RAR as slot location of CORESET, the OFDM symbol locations of a CORESET specific for RAR, CORESET periodicity if deemed necessary beyond RAR CORESET.

RACH Slots and RACH Symbols: The mapping of multiple PRACH preamble formats depending on the number of PDCCH symbols is explained below:

1 symbol and 2-symbol duration preamble format: These formats can be sent anywhere inside slot and there will be no issues whether the CORESET monitoring periodicity is 2/4/7/14 symbols. They just have to avoid symbols needed for PDCCH scheduling.

4 symbol duration preamble format (A2/B2): The FIG. 14 indicates the candidate PRACH symbol mapping in the slot depending on the CORESET monitoring periodicity.

Figure 15:
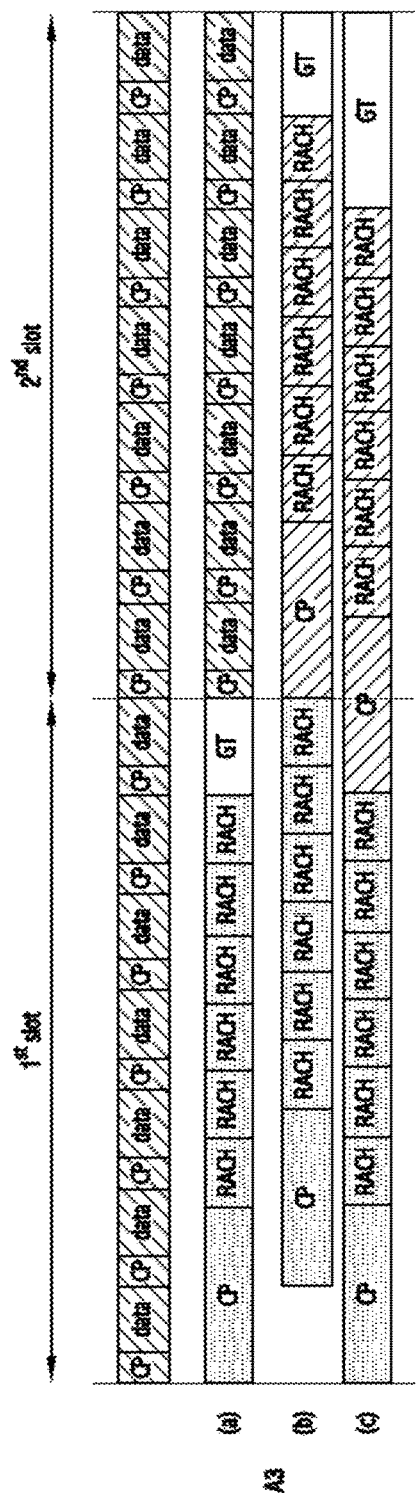
FIG. 15 depicts another CORESET mapping for RAR to support slot-based scheduling, according to embodiments as disclosed herein.

6 symbol duration preamble formats: As shown in the FIG. 14, it can be assumed that when the first two symbols are not used for RACH transmission, format A3 might be allocated across slots. And, the BS 110 cannot allocate consecutive two A3 formats even in 14-symbol slot. When format A3 is used, there are three usage cases considering 14-symbol slot, as represented in FIG. 15. Considering UL/DL configuration, the RACH transmission should be done within the first slot or the second slot. The notation "a" of the FIG. 14 shows the PRACH mapping within first slot. Format A3 within the first slot should be allocated at the first symbol as the last OFDM symbol can be used as GT to avoid ISI to following data channel. The notation "b" and notation "c" of the FIG. 15 show cases when two preamble format occasions are considered during 14-symbol slot, which is possible only in case of full UL slot.

12 symbol duration preamble formats: This format can be supported only using a full UL slot. Based on this observation, it is clear that a UE must be indicated the slots where RACH can be performed by the UE and in these slots it must be indicated the symbols, which can carry RACH preambles. Since the slot format is changing dynamically, the SFI information must be indicated to the user, for instance via SIB.

Using this information, the UE 120 knows the slot structure. Then the BS 110 indicates the RACH preamble format in the RACH configuration, which is valid for all UEs within the cell. Then a fixed mapping can be defined for each RACH preamble format depending on the slot formats indicated in the SIB.

FIG. 16 depicts an example slot format indicated to the UE 120. For this slot format, the UE 120 can send RACH preambles on any of the UL symbols. Then, based on the restrictions indicated above, this slot format supports, 1-, 2- and 4-symbol PRACH preamble formats. Other formats cannot be sent when the UE 120 knows that this slot format is being used by the cell.

Since not all such slots can be used by the UE 120, there can be some periodicity associated with this slot structure, which carries RACH i.e., the behavior as depicted in FIG. 17 can be considered to be supported in BS 110. FIG. 16 depicts an example the slot format with potential RACH locations (RACH slots) given to the UE 120. In FIG. 17, it indicates that the slots that can support RACH occur with a periodicity of 3 slots. This periodicity can be indicated in absolute time duration (in milli-seconds) as in the LTE or in number of slots. Therefore, once the SFI is indicated via SIB, and the preamble format is indicated via the RACH configuration, the UE 120 needs to be indicated the periodicity/location of the RACH in the UL portion of these slots. Within the RACH locations in the UL portion of the slots, fixed mapping per preamble format is defined based on the constraints of the specific preamble format. Then among these RACh symbols, the UE 120 will find the one suitable for its SSB index based on SSB-RACH mapping.

The slot format is indicated for every numerology. Then based on Msg1 SCS, the UE 120 will send at the appropriate time instant. The slot format could be indicated in terms of a) SS block numerology, Msg1 numerology configured in RMSI, or some reference numerology fixed in specification.

Figure 18:
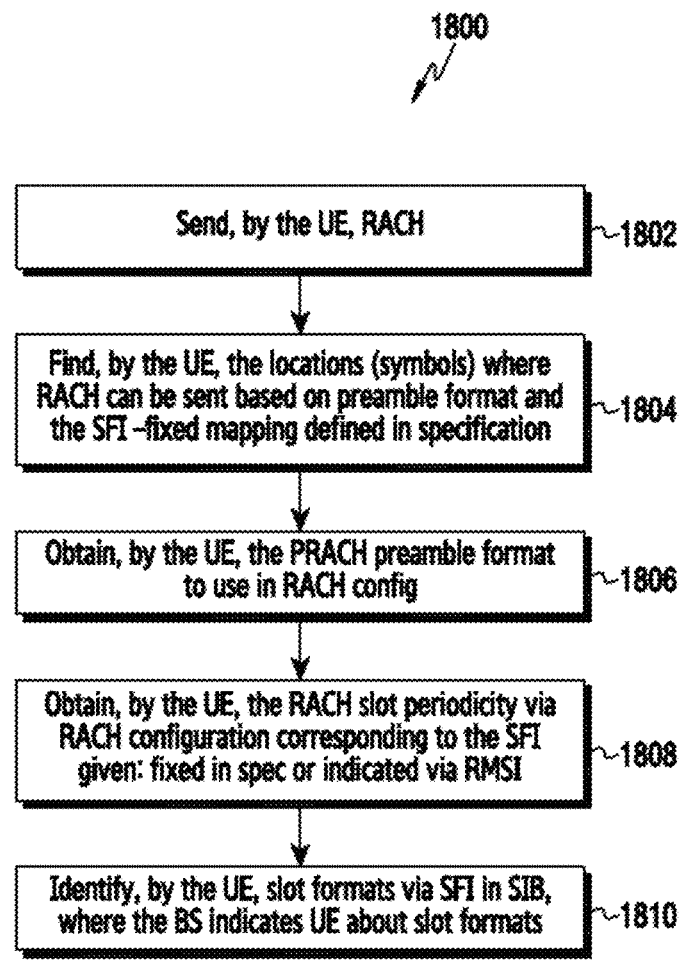
FIG. 18 is a flow chart illustrating a method for mapping of multiple PRACH preamble formats, according to embodiments as disclosed herein.

FIG. 18 is a flow chart 1800 illustrating a method for mapping of multiple PRACH preamble formats, according to embodiments as disclosed herein. The operations are performed by the UE 120. At step 1802, the method includes sending the RACH. At step 1804, the method includes finding the locations (symbols) where the RACH can be sent based on preamble format and the SFI-fixed mapping defined in 3GPP specification. At step 1806, the method includes obtaining the PRACH preamble format to use in the RACH config. At step 1808, the method includes obtaining the RACH slot periodicity via the RACH configuration corresponding to the SFI given: fixed in spec or indicated via the RMSI. At step 1810, the method includes identifying the slot formats via SFI in SIB, where the BS 110 indicates the UE 120 about the slot formats.

The various actions, acts, blocks, steps, or the like in the flow diagram 1800 may be performed in the order presented, in a different order or simultaneously. Further, in some embodiments, some of the actions, acts, blocks, steps, or the like may be omitted, added, modified, skipped, or the like without departing from the scope of the disclosure.

Figure 19:
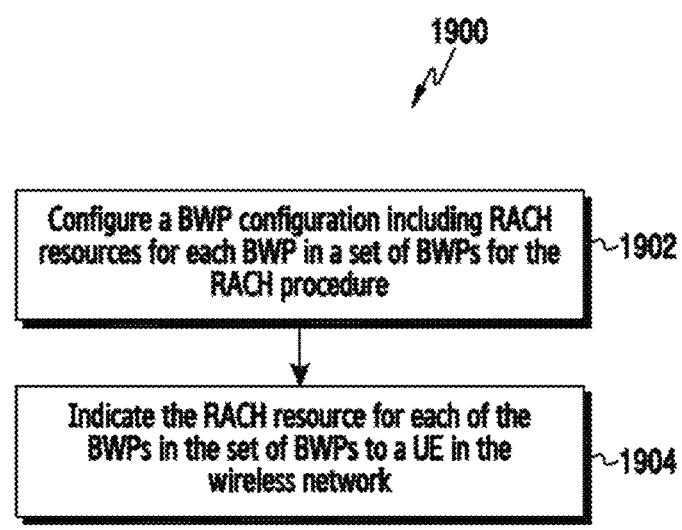
FIG. 19 is flow diagram illustrating a method for indicating the RACH resource for each of the BWPs in the set of BWPs to the UE, according to an embodiment as disclosed herein.

FIG. 19 is a flow diagram 1900 illustrating a method for indicating the RACH resource for each of the BWPs in the set of BWPs to the UE 120, according to an embodiment as disclosed herein. The operations are performed by the BWP controller 1114. For example, the operations 1902 and 1904 are performed by the BWP controller 1114 or the base station 110

At step 1902, the method includes configuring the BWP configuration having RACH resources for each BWP in the set of BWPs for the RACH procedure. At step 1904, the method includes indicating the RACH resource for each of the BWPs in the set of BWPs to the UE 120 in the wireless network.

The various actions, acts, blocks, steps, or the like in the flow diagram 1900 may be performed in the order presented, in a different order or simultaneously. Further, in some embodiments, some of the actions, acts, blocks, steps, or the like may be omitted, added, modified, skipped, or the like without departing from the scope of the disclosure.

Figure 20:
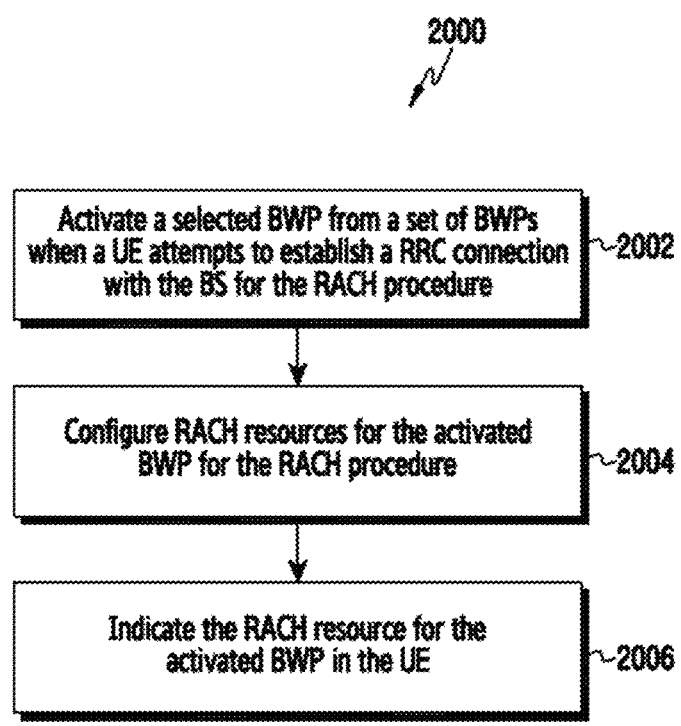
FIG. 20 is flow diagram illustrating a method for indicating the RACH resource for the activated BWP in the UE, according to an embodiment as disclosed herein.

FIG. 20 is a flow diagram 2000 illustrating a method for indicating the RACH resource for the activated BWP in the UE 120, according to an embodiment as disclosed herein. For example, the operations 2002, 2004 and 2006 are performed by the BWP controller 1114 or the base station 110.

At step 2002, the method includes activating the selected BWP from the set of BWPs when the UE 120 attempts to establish the RRC connection with the BS 110 for the RACH procedure. At step 2004, the method includes configuring the RACH resources for the activated BWP for the RACH procedure. At step 2006, the method includes indicating the RACH resource for the activated BWP in the UE 120.

The various actions, acts, blocks, steps, or the like in the flow diagram 2000 may be performed in the order presented, in a different order or simultaneously. Further, in some embodiments, some of the actions, acts, blocks, steps, or the like may be omitted, added, modified, skipped, or the like without departing from the scope of the disclosure.

Figure 21:
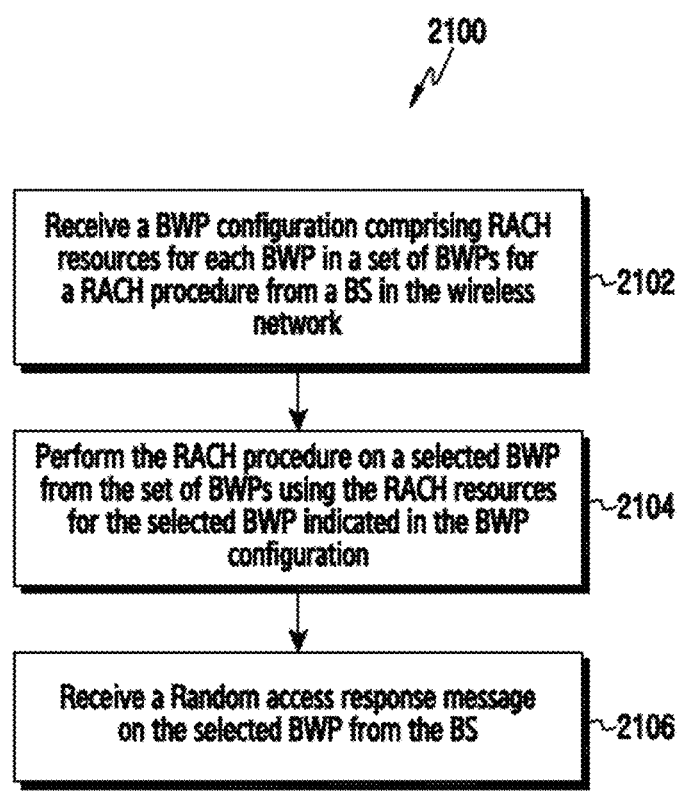
FIG. 21 is flow diagram illustrating a method for receiving the random access response message on the selected BWP from the BS, according to an embodiment as disclosed herein.

FIG. 21 is flow diagram 2100 illustrating a method for receiving the random access response message on the selected BWP from the BS 110, according to an embodiment as disclosed herein. For example, the operations 2102, 2104 and 2106 are performed by the BWP controller 1124 or the UE 120.

At step 2102, the method includes receiving the BWP configuration comprising RACH resources for each BWP in the set of BWPs for the RACH procedure from the BS 110 in the wireless network. At step 2104, the method includes performing the RACH procedure on the selected BWP from the set of BWPs using the RACH resources for the selected BWP indicated in the BWP configuration. At step 2106, the method includes receiving the random access response message on the selected BWP from the BS 110.

The various actions, acts, blocks, steps, or the like in the flow diagram 2100 may be performed in the order presented, in a different order or simultaneously. Further, in some embodiments, some of the actions, acts, blocks, steps, or the like may be omitted, added, modified, skipped, or the like without departing from the scope of the disclosure.

Figure 22:
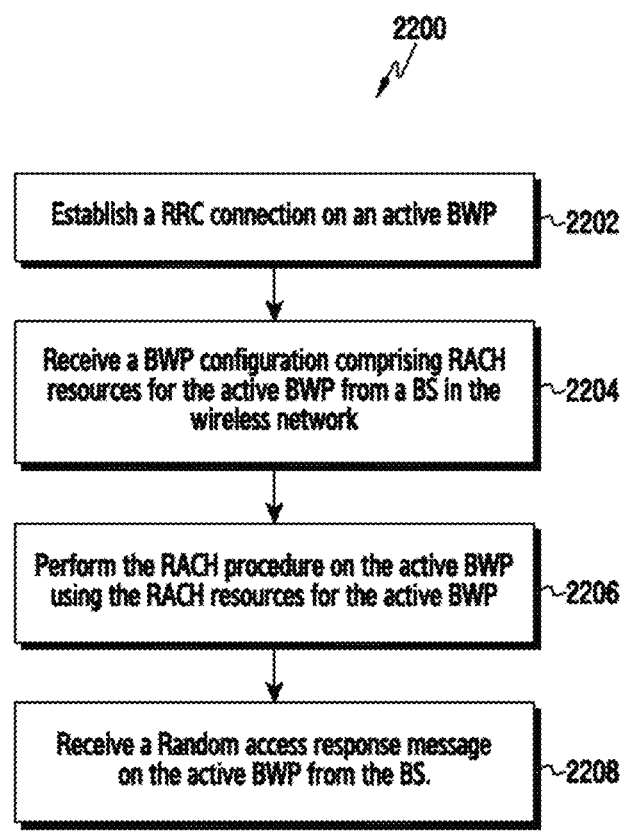
FIG. 22 is flow diagram illustrating a method for receiving the random access response message on the active BWP from the BS, according to an embodiment as disclosed herein.

FIG. 22 is flow diagram 2200 illustrating a method for receiving the random access response message on the active BWP from the BS 110, according to an embodiment as disclosed herein. For example, the operations 2202, 2204, 2206 and 2208 are performed by the BWP controller 1124 or the UE 120.

At step 2202, the method includes establishing the RRC connection on the active BWP. At step 2204, the method includes receiving the BWP configuration comprising RACH resources for the active BWP from the BS 110 in the wireless network. At step 2206, the method includes performing the RACH procedure on the active BWP using the RACH resources for the active BWP. At step 2208, the method includes receiving the random access response message on the active BWP from the BS 110.

The various actions, acts, blocks, steps, or the like in the flow diagram 2200 may be performed in the order presented, in a different order or simultaneously. Further, in some embodiments, some of the actions, acts, blocks, steps, or the like may be omitted, added, modified, skipped, or the like without departing from the scope of the disclosure.

The embodiments disclosed herein can be implemented through at least one software program running on at least one hardware device and performing network management functions to control the elements. The elements can be at least one of a hardware device, or a combination of hardware device and software module.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
   receiving, from a base station, a radio resource control (RRC) reconfiguration message including:
      a random access channel (RACH) resource configuration for one or more uplink bandwidth parts (BWPs),
      location information for each BWP,
      subcarrier spacing (SCS) information for each BWP, and
      information indicating a default uplink BWP for a secondary cell (SCell);
   receiving, from the base station, an SCell activation command;
   activating the default uplink BWP based on the SCell activation command;
   transmitting a RACH preamble on the activated default uplink BWP among the one or more uplink BWPs;
   receiving a random access response (RAR) including a timing advance (TA) value;
   identifying an SCS of an uplink transmission after the reception of the RAR, according to the RRC reconfiguration message; and
   performing the uplink transmission after the reception of the RAR based on a timing alignment corresponding to the TA value,
   wherein the timing alignment is identified based on the TA value and a step size associated with a granularity, and
   wherein the step size is inversely proportional to the identified SCS of the uplink transmission after the reception of the RAR.

2. A base station (B S) in a wireless communication system, the BS comprising:
   a transceiver; and
   a processor operably coupled to the transceiver and configured to:
      transmit, to a user equipment (UE), a radio resource control (RRC) reconfiguration message including:
         a random access channel (RACH) resource configuration for one or more uplink bandwidth parts (BWPs),
         location information for each BWP,
         subcarrier spacing (SCS) information for each BWP, and
         information indicating a default uplink BWP for a secondary cell (SCell);
      transmit, to the UE, an SCell activation command to activate the default uplink BWP;
      receive, from the UE, a RACH preamble on the activated default uplink BWP among the one or more uplink BWPs;
      transmit, to the UE, a random access response (RAR) including a timing advance (TA) value; and
      receive, from the UE, an uplink transmission after the RAR based on a timing alignment corresponding to the TA value,
   wherein the timing alignment is identified based on the TA value and a step size associated with a granularity,
   wherein the step size is inversely proportional to an SCS of the uplink transmission after the RAR, and
   wherein the SCS of the uplink transmission after the RAR is indicated in the RRC reconfiguration message.

3. A user equipment (UE) in a wireless communication system, the UE comprising:
   a transceiver; and
   a processor operably coupled to the transceiver and configured to:
      receive, from a base station, a radio resource control (RRC) reconfiguration message including:
         a random access channel (RACH) resource configuration for one or more uplink bandwidth parts (BWPs),
         location information for each BWP,
         subcarrier spacing (SCS) information for each BWP, and
         information indicating a default uplink BWP for a secondary cell (SCell);
      receive, from the base station, an SCell activation command;
      activate the default uplink BWP based on the SCell activation command;
      transmit a RACH preamble on the activated default uplink BWP among the one or more uplink BWPs;
      receive a random access response (RAR) including a timing advance (TA) value;
      identify an SCS of an uplink transmission after the reception of the RAR, based on the RRC reconfiguration message; and
      perform the uplink transmission after the reception of the RAR based on a timing alignment corresponding to the TA value,
   wherein the timing alignment is identified based on the TA value and a step size associated with a granularity, and
   wherein the step size is inversely proportional to the identified SCS of the uplink transmission after the reception of the RAR.

4. The method of claim 1,
   wherein the default uplink BWP is activated among the one or more uplink BWPs, and
   wherein the RACH preamble is transmitted on the SCell in response to a physical downlink control channel (PDCCH) order received on a scheduling cell of timing advance group (TAG) in which the SCell belongs.

5. The method of claim 1,
   wherein an SCS of the RACH preamble is configured in the RRC reconfiguration message, and
   wherein the one or more uplink BWPs are configured based on the RRC reconfiguration message.

6. The method of claim 1, further comprising:
   activating a next uplink BWP;
   switching the next uplink BWP to an initial uplink BWP in case that a RACH resource is not configured for the next uplink BWP; and
   performing a RACH procedure on the initial uplink BWP.

7. The BS of claim 2, wherein the default uplink BWP is activated among the one or more uplink BWPs, and wherein the RACH preamble is received on the SCell in response to a physical downlink control channel (PDCCH) order on a scheduling cell of timing advance group (TAG) in which the SCell belongs.

8. The BS of claim 2,
wherein an SCS of the RACH preamble is configured in the RRC reconfiguration message, and
wherein the one or more uplink BWPs are configured based on the RRC reconfiguration message.

9. The BS of claim 2, wherein the processor is further configured to perform a RACH procedure on an initial uplink BWP,
wherein a next uplink BWP is activated, and
wherein the next uplink BWP is switched to an initial uplink BWP in case that a RACH resource is not configured for the next uplink BWP.

10. The UE of claim 3, wherein the default uplink BWP is activated among the one or more uplink BWPs, and
wherein the RACH preamble is transmitted on the SCell in response to a physical downlink control channel (PDCCH) order received on a scheduling cell of timing advance group (TAG) in which the SCell belongs.

11. The UE of claim 3,
wherein an SCS of the RACH preamble is configured in the RRC reconfiguration message, and
wherein the one or more uplink BWPs are configured based on the RRC reconfiguration message.

12. The UE of claim 3, wherein the processor is further configured to:
activate a next uplink BWP;
switch the next uplink BWP to an initial uplink BWP in case that a RACH resource is not configured for the next uplink BWP; and
perform a RACH procedure on the initial uplink BWP.

13. A method performed by a base station in a wireless communication system, the method comprising:
transmitting, to a user equipment (UE), a radio resource control (RRC) reconfiguration message including:
a random access channel (RACH) resource configuration for one or more uplink bandwidth parts (BWPs),
location information for each BWP,
subcarrier spacing (SCS) information for each BWP, and
information indicating a default uplink BWP for a secondary cell (SCell);
transmitting, to the UE, an SCell activation command to activate the default uplink BWP,
receiving, from the UE, a RACH preamble on the activated default uplink BWP among the one or more uplink BWPs;
transmitting, to the UE, a random access response (RAR) including a timing advance (TA) value; and
receiving, from the UE, an uplink transmission after the RAR based on a timing alignment corresponding to the TA value,
wherein the timing alignment is identified based on the TA value and a step size associated with a granularity,
wherein the step size is inversely proportional to an SCS of the uplink transmission after the RAR, and
wherein the SCS of the uplink transmission after the RAR is indicated in the RRC reconfiguration message.

14. The method of claim 13, wherein the default uplink BWP is activated among the one or more uplink BWPs, and
wherein the RACH preamble is received on the SCell in response to a physical downlink control channel (PDCCH) order on a scheduling cell of timing advance group (TAG) in which the SCell belongs.

15. The method of claim 13,
wherein an SCS of the RACH preamble is configured in the RRC reconfiguration message, and
wherein the one or more uplink BWPs are configured based on the RRC reconfiguration message.

16. The method of claim 13, further comprising:
performing a RACH procedure on an initial uplink BWP,
wherein a next uplink BWP is activated, and
wherein the next uplink BWP is switched to an initial uplink BWP in case that a RACH resource is not configured for the next uplink BWP.

* * * * *